(12) United States Patent
Baldwin et al.

(10) Patent No.: US 10,297,249 B2
(45) Date of Patent: May 21, 2019

(54) SYSTEM AND METHOD FOR A COOPERATIVE CONVERSATIONAL VOICE USER INTERFACE

(71) Applicant: VB Assets, LLC, Bellevue, WA (US)

(72) Inventors: Larry Baldwin, Maple Valley, WA (US); Tom Freeman, Mercer Island, WA (US); Michael Tjalve, Bellevue, WA (US); Blane Ebersold, Seattle, WA (US); Chris Weider, Everett, WA (US)

(73) Assignee: VB Assets, LLC, Bellevue, WA (US)

( * ) Notice: Subject to any disclaimer, the term of this patent is extended or adjusted under 35 U.S.C. 154(b) by 289 days.

(21) Appl. No.: 14/691,445

(22) Filed: Apr. 20, 2015

(65) Prior Publication Data

US 2015/0228276 A1 Aug. 13, 2015

Related U.S. Application Data

(60) Continuation of application No. 13/987,645, filed on Aug. 19, 2013, now Pat. No. 9,015,049, which is a
(Continued)

(51) Int. Cl.
*G06F 3/16* (2006.01)
*G06F 17/27* (2006.01)
(Continued)

(52) U.S. Cl.
CPC .............. *G10L 15/18* (2013.01); *G06F 3/167* (2013.01); *G06F 17/2785* (2013.01);
(Continued)

(58) Field of Classification Search
CPC . G10L 15/22; G10L 15/1815; G10L 15/1822; G10L 15/183; G10L 2015/225;
(Continued)

(56) References Cited

U.S. PATENT DOCUMENTS

| 4,430,669 A | 2/1984 | Cheung ......................... 358/122 |
| 4,821,027 A | 4/1989 | Mallory et al. ............... 340/521 |

(Continued)

FOREIGN PATENT DOCUMENTS

| CN | 1433554 A | 7/2003 |
| CN | 1860496 A | 11/2006 |

(Continued)

OTHER PUBLICATIONS

Kirchhoff, Katrin, "Syllable-Level Desynchronisation of Phonetic Features for Speech Recognition", Proceedings of the Fourth International Conference on Spoken Language, 1996, ICSLP 96, vol. 4, IEEE, 1996, 3 pages.

(Continued)

*Primary Examiner* — Eric Yen
(74) *Attorney, Agent, or Firm* — Sheppard Mullin Richter & Hampton LLP

(57) ABSTRACT

A cooperative conversational voice user interface is provided. The cooperative conversational voice user interface may build upon short-term and long-term shared knowledge to generate one or more explicit and/or implicit hypotheses about an intent of a user utterance. The hypotheses may be ranked based on varying degrees of certainty, and an adaptive response may be generated for the user. Responses may be worded based on the degrees of certainty and to frame an appropriate domain for a subsequent utterance. In one implementation, misrecognitions may be tolerated, and conversational course may be corrected based on subsequent utterances and/or responses.

28 Claims, 3 Drawing Sheets

Related U.S. Application Data division of application No. 13/251,712, filed on Oct. 3, 2011, now Pat. No. 8,515,765, which is a continuation of application No. 11/580,926, filed on Oct. 16, 2006, now Pat. No. 8,073,681.

(51) Int. Cl.

| | |
|---|---|
| G10L 15/06 | (2013.01) |
| G10L 15/18 | (2013.01) |
| G10L 15/22 | (2006.01) |
| G10L 17/22 | (2013.01) |
| G10L 25/51 | (2013.01) |
| G10L 15/183 | (2013.01) |
| G10L 21/0216 | (2013.01) |

(52) U.S. Cl.
CPC ...... *G10L 15/1815* (2013.01); *G10L 15/1822* (2013.01); *G10L 15/22* (2013.01); *G10L 17/22* (2013.01); *G10L 25/51* (2013.01); *G10L 15/183* (2013.01); *G10L 2015/0631* (2013.01); *G10L 2015/225* (2013.01); *G10L 2015/228* (2013.01); *G10L 2021/02166* (2013.01)

(58) Field of Classification Search
CPC ..... G10L 2015/228; G10L 2021/02166; G10L 25/51; G06F 17/27; G06F 17/2785
See application file for complete search history.

(56) References Cited

U.S. PATENT DOCUMENTS

| | | | | |
|---|---|---|---|---|
| 4,829,423 | A | 5/1989 | Tennant et al. | 364/200 |
| 4,887,212 | A | 12/1989 | Zamora | |
| 4,910,784 | A | 3/1990 | Doddington et al. | 381/43 |
| 5,027,406 | A | 6/1991 | Roberts et al. | 381/43 |
| 5,155,743 | A | 10/1992 | Jacobs | 375/28 |
| 5,164,904 | A | 11/1992 | Sumner | 364/436 |
| 5,208,748 | A | 5/1993 | Flores et al. | 364/419 |
| 5,265,065 | A | 11/1993 | Turtle | |
| 5,274,560 | A | 12/1993 | LaRue | 364/444 |
| 5,331,554 | A | 7/1994 | Graham | |
| 5,357,596 | A | 10/1994 | Takebayashi et al. | 395/2.84 |
| 5,369,575 | A | 11/1994 | Lamberti | |
| 5,377,350 | A | 12/1994 | Skinner | 395/600 |
| 5,386,556 | A | 1/1995 | Hedin et al. | 395/600 |
| 5,424,947 | A | 6/1995 | Nagao et al. | 364/419.08 |
| 5,471,318 | A | 11/1995 | Ahuja et al. | 358/400 |
| 5,475,733 | A | 12/1995 | Eisdorfer et al. | 379/52 |
| 5,479,563 | A | 12/1995 | Yamaguchi | |
| 5,488,652 | A | 1/1996 | Bielby et al. | 379/88 |
| 5,499,289 | A | 3/1996 | Bruno et al. | 379/220 |
| 5,500,920 | A | 3/1996 | Kupiec | 395/2.79 |
| 5,517,560 | A | 5/1996 | Greenspan | 379/114 |
| 5,533,108 | A | 7/1996 | Harris et al. | 379/201 |
| 5,537,436 | A | 7/1996 | Bottoms et al. | 375/222 |
| 5,539,744 | A | 7/1996 | Chu et al. | 370/60 |
| 5,557,667 | A | 9/1996 | Bruno et al. | 379/201 |
| 5,559,864 | A | 9/1996 | Kennedy, Jr. | 379/59 |
| 5,563,937 | A | 10/1996 | Bruno et al. | 379/201 |
| 5,577,165 | A | 11/1996 | Takebayashi et al. | 395/2.84 |
| 5,590,039 | A | 12/1996 | Ikeda et al. | 395/759 |
| 5,608,635 | A | 3/1997 | Tamai | 364/449.3 |
| 5,615,296 | A * | 3/1997 | Stanford | G10L 15/22 704/222 |
| 5,617,407 | A | 4/1997 | Bareis | 369/275.3 |
| 5,633,922 | A | 5/1997 | August et al. | 379/220 |
| 5,634,086 | A | 5/1997 | Rtischev et al. | 395/2.79 |
| 5,652,570 | A | 7/1997 | Lepkofker | 340/573 |
| 5,675,629 | A | 10/1997 | Raffel et al. | 379/58 |
| 5,696,965 | A | 12/1997 | Dedrick | 395/610 |
| 5,708,422 | A | 1/1998 | Blonder et al. | 340/825.34 |
| 5,721,938 | A | 2/1998 | Stuckey | 395/754 |
| 5,722,084 | A | 2/1998 | Chakrin et al. | 455/551 |
| 5,740,256 | A | 4/1998 | Castello Da Costa et al. | 361/94.7 |
| 5,742,763 | A | 4/1998 | Jones | 395/200.3 |
| 5,748,841 | A * | 5/1998 | Morin | G06F 3/16 704/257 |
| 5,748,974 | A | 5/1998 | Johnson | 395/759 |
| 5,752,052 | A | 5/1998 | Richardson et al. | 395/759 |
| 5,754,784 | A | 5/1998 | Garland et al. | 395/200.49 |
| 5,761,631 | A | 6/1998 | Nasukawa | 704/9 |
| 5,774,841 | A | 6/1998 | Salazar et al. | 704/225 |
| 5,774,859 | A | 6/1998 | Houser et al. | 704/275 |
| 5,794,050 | A | 8/1998 | Dahlgren et al. | 395/708 |
| 5,794,196 | A | 8/1998 | Yegnanarayanan et al. | 704/255 |
| 5,797,112 | A | 8/1998 | Komatsu et al. | 701/201 |
| 5,799,276 | A | 8/1998 | Komissarchik et al. | 704/251 |
| 5,802,510 | A | 9/1998 | Jones | 707/2 |
| 5,829,000 | A | 10/1998 | Huang | |
| 5,832,221 | A | 11/1998 | Jones | 375/200.36 |
| 5,839,107 | A | 11/1998 | Gupta et al. | 704/270 |
| 5,848,396 | A | 12/1998 | Gerace | 705/10 |
| 5,855,000 | A | 12/1998 | Waibel et al. | 704/235 |
| 5,860,059 | A * | 1/1999 | Aust | G06F 3/16 704/231 |
| 5,867,817 | A | 2/1999 | Catallo et al. | 704/255 |
| 5,878,385 | A | 3/1999 | Bralich et al. | 704/9 |
| 5,878,386 | A | 3/1999 | Coughlin | 704/10 |
| 5,892,813 | A | 4/1999 | Morin et al. | 379/88.01 |
| 5,892,900 | A | 4/1999 | Ginter et al. | 395/186 |
| 5,895,464 | A | 4/1999 | Bhandari et al. | 707/3 |
| 5,895,466 | A | 4/1999 | Goldberg et al. | 707/5 |
| 5,897,613 | A | 4/1999 | Chan | 704/210 |
| 5,899,991 | A * | 5/1999 | Karch | G06F 21/55 707/694 |
| 5,902,347 | A | 5/1999 | Backman et al. | 701/200 |
| 5,911,120 | A | 6/1999 | Jarett et al. | 455/417 |
| 5,918,222 | A * | 6/1999 | Fukui | G06Q 10/10 |
| 5,926,784 | A | 7/1999 | Richardson et al. | 704/9 |
| 5,933,822 | A | 8/1999 | Braden-Harder et al. | 707/5 |
| 5,950,167 | A | 9/1999 | Yaker | 704/275 |
| 5,953,393 | A | 9/1999 | Culbreth et al. | 379/88.25 |
| 5,960,384 | A | 9/1999 | Brash | |
| 5,960,397 | A | 9/1999 | Rahim | 704/244 |
| 5,960,399 | A | 9/1999 | Barclay et al. | 704/270 |
| 5,960,447 | A | 9/1999 | Holt et al. | 707/500 |
| 5,963,894 | A | 10/1999 | Richardson et al. | 704/9 |
| 5,963,940 | A | 10/1999 | Liddy et al. | 707/5 |
| 5,982,906 | A * | 11/1999 | Ono | G10L 21/0208 381/94.1 |
| 5,983,190 | A | 11/1999 | Trower, II | |
| 5,987,404 | A | 11/1999 | Della Pietra et al. | 704/9 |
| 5,991,721 | A | 11/1999 | Asano et al. | 704/257 |
| 5,995,119 | A | 11/1999 | Cosatto et al. | 345/473 |
| 5,995,928 | A | 11/1999 | Nguyen et al. | 704/251 |
| 5,995,943 | A | 11/1999 | Bull | |
| 6,009,382 | A | 12/1999 | Martino et al. | 704/1 |
| 6,014,559 | A | 1/2000 | Amin | 455/413 |
| 6,018,708 | A | 1/2000 | Dahan et al. | 704/244 |
| 6,021,384 | A | 2/2000 | Gorin et al. | 704/1 |
| 6,028,514 | A | 2/2000 | Lemelson et al. | 340/539 |
| 6,035,267 | A | 3/2000 | Watanabe et al. | 704/1 |
| 6,044,347 | A | 3/2000 | Abella et al. | 704/272 |
| 6,049,602 | A | 4/2000 | Foladare et al. | 379/265 |
| 6,049,607 | A | 4/2000 | Marash et al. | 379/410 |
| 6,058,187 | A | 5/2000 | Chen | 380/21 |
| 6,067,513 | A | 5/2000 | Ishimitsu | 704/233 |
| 6,073,098 | A | 6/2000 | Buchsbaum | |
| 6,076,059 | A | 6/2000 | Glickman et al. | 704/260 |
| 6,078,886 | A * | 6/2000 | Dragosh | G10L 15/30 704/243 |
| 6,081,774 | A | 6/2000 | De Hita et al. | 704/9 |
| 6,085,186 | A | 7/2000 | Christianson et al. | 707/3 |
| 6,101,241 | A | 8/2000 | Boyce et al. | 379/88.01 |
| 6,108,631 | A | 8/2000 | Ruhl | 704/270 |
| 6,119,087 | A | 9/2000 | Kuhn et al. | 704/270 |
| 6,119,101 | A | 9/2000 | Peckover | |
| 6,122,613 | A | 9/2000 | Baker | 704/235 |
| 6,134,235 | A | 10/2000 | Goldman et al. | 370/352 |
| 6,144,667 | A | 11/2000 | Doshi et al. | 370/401 |

(56) References Cited

U.S. PATENT DOCUMENTS

| | | | |
|---|---|---|---|
| 6,144,938 A | 11/2000 | Surace et al. | 704/257 |
| 6,154,526 A | 11/2000 | Dahlke et al. | 379/88.03 |
| 6,160,883 A | 12/2000 | Jackson et al. | 379/230 |
| 6,167,377 A | 12/2000 | Gillick et al. | 704/240 |
| 6,173,266 B1 | 1/2001 | Marx et al. | 704/270 |
| 6,173,279 B1 | 1/2001 | Levin et al. | 707/5 |
| 6,175,858 B1 | 1/2001 | Bulfer et al. | 709/206 |
| 6,185,535 B1 | 2/2001 | Hedin et al. | 704/270 |
| 6,188,982 B1 | 2/2001 | Chiang | 704/256 |
| 6,192,110 B1 | 2/2001 | Abella et al. | 379/88.01 |
| 6,192,338 B1 | 2/2001 | Haszto et al. | 704/257 |
| 6,195,634 B1 | 2/2001 | Dudemaine et al. | 704/231 |
| 6,195,651 B1 | 2/2001 | Handel et al. | 707/2 |
| 6,199,043 B1 | 3/2001 | Happ | 704/272 |
| 6,208,964 B1 | 3/2001 | Sabourin | 704/244 |
| 6,208,972 B1 | 3/2001 | Grant et al. | 704/275 |
| 6,219,346 B1 | 4/2001 | Maxemchuk | 370/338 |
| 6,219,643 B1 | 4/2001 | Cohen et al. | 704/257 |
| 6,219,645 B1 * | 4/2001 | Byers | G10L 15/02 381/91 |
| 6,226,612 B1 | 5/2001 | Srenger et al. | 704/256 |
| 6,233,556 B1 | 5/2001 | Teunen et al. | 704/250 |
| 6,233,559 B1 | 5/2001 | Balakrishnan | 704/275 |
| 6,233,561 B1 | 5/2001 | Junqua et al. | 704/277 |
| 6,236,968 B1 | 5/2001 | Kanevsky et al. | 704/275 |
| 6,243,679 B1 | 6/2001 | Mohri | |
| 6,246,981 B1 * | 6/2001 | Papineni | G10L 15/22 704/235 |
| 6,246,990 B1 | 6/2001 | Happ | 704/275 |
| 6,266,636 B1 | 7/2001 | Kosaka et al. | 704/244 |
| 6,269,336 B1 | 7/2001 | Ladd et al. | 704/270 |
| 6,272,455 B1 | 8/2001 | Hoshen et al. | 704/1 |
| 6,272,461 B1 * | 8/2001 | Meredith | G10L 15/26 704/235 |
| 6,275,231 B1 | 8/2001 | Obradovich | 345/349 |
| 6,278,377 B1 | 8/2001 | DeLine et al. | 340/815.4 |
| 6,278,968 B1 | 8/2001 | Franz et al. | 704/3 |
| 6,286,002 B1 | 9/2001 | Axaopoulos | |
| 6,288,319 B1 | 9/2001 | Catona | 84/609 |
| 6,292,767 B1 | 9/2001 | Jackson et al. | 704/1 |
| 6,301,560 B1 | 10/2001 | Masters | 704/251 |
| 6,308,151 B1 | 10/2001 | Smith | 704/235 |
| 6,311,159 B1 | 10/2001 | Van Tichelen et al. | 704/275 |
| 6,314,402 B1 | 11/2001 | Monaco et al. | 704/275 |
| 6,321,196 B1 | 11/2001 | Franceschi | 704/243 |
| 6,356,869 B1 | 3/2002 | Chapados et al. | 704/275 |
| 6,362,748 B1 | 3/2002 | Huang | 340/901 |
| 6,366,882 B1 | 4/2002 | Bijl et al. | 704/235 |
| 6,366,886 B1 | 4/2002 | Dragosh et al. | 704/270.1 |
| 6,374,214 B1 | 4/2002 | Friedland et al. | 704/235 |
| 6,374,226 B1 * | 4/2002 | Hunt | G10L 15/26 704/255 |
| 6,377,913 B1 | 4/2002 | Coffman et al. | 704/8 |
| 6,377,919 B1 * | 4/2002 | Burnett | A61B 5/0507 704/231 |
| 6,381,535 B1 | 4/2002 | Durocher et al. | 701/202 |
| 6,385,596 B1 | 5/2002 | Wiser et al. | 705/51 |
| 6,385,646 B1 | 5/2002 | Brown et al. | 709/217 |
| 6,389,398 B1 * | 5/2002 | Lustgarten | G10L 15/22 379/88.01 |
| 6,393,403 B1 | 5/2002 | Majaniemi | 704/275 |
| 6,393,428 B1 | 5/2002 | Miller et al. | 707/102 |
| 6,397,181 B1 | 5/2002 | Li et al. | 704/256 |
| 6,404,878 B1 | 6/2002 | Jackson et al. | 379/221.01 |
| 6,405,170 B1 | 6/2002 | Phillips et al. | 704/270 |
| 6,408,272 B1 | 6/2002 | White et al. | 704/270.1 |
| 6,411,810 B1 | 6/2002 | Maxemchuk | 455/453 |
| 6,411,893 B2 | 6/2002 | Ruhl | 701/207 |
| 6,415,257 B1 | 7/2002 | Junqua et al. | 704/275 |
| 6,418,210 B1 | 7/2002 | Sayko | 379/142.15 |
| 6,420,975 B1 | 7/2002 | DeLine et al. | 340/815.4 |
| 6,429,813 B2 | 8/2002 | Feigen | 342/357.13 |
| 6,430,285 B1 | 8/2002 | Bauer et al. | 379/265.01 |
| 6,430,531 B1 | 8/2002 | Polish | 704/257 |
| 6,434,523 B1 | 8/2002 | Monaco | 704/257 |
| 6,434,524 B1 | 8/2002 | Weber | 704/257 |
| 6,434,529 B1 | 8/2002 | Walker et al. | 704/275 |
| 6,442,522 B1 | 8/2002 | Carberry et al. | 704/257 |
| 6,446,114 B1 | 9/2002 | Bulfer et al. | 709/206 |
| 6,453,153 B1 | 9/2002 | Bowker et al. | 455/67.4 |
| 6,453,292 B2 | 9/2002 | Ramaswamy et al. | 704/235 |
| 6,456,711 B1 | 9/2002 | Cheung et al. | 379/265.09 |
| 6,456,974 B1 | 9/2002 | Baker et al. | 704/270.1 |
| 6,466,654 B1 | 10/2002 | Cooper et al. | 379/88.01 |
| 6,466,899 B1 | 10/2002 | Yano et al. | 704/1 |
| 6,470,315 B1 | 10/2002 | Netsch et al. | 704/256 |
| 6,487,494 B2 | 11/2002 | Odinak et al. | 701/202 |
| 6,487,495 B1 | 11/2002 | Gale et al. | 701/209 |
| 6,498,797 B1 | 12/2002 | Anerousis et al. | 370/522 |
| 6,499,013 B1 | 12/2002 | Weber | 704/257 |
| 6,501,833 B2 | 12/2002 | Phillips et al. | 379/88.07 |
| 6,501,834 B1 | 12/2002 | Milewski et al. | 379/93.24 |
| 6,505,155 B1 | 1/2003 | Vanbuskirk et al. | 704/246 |
| 6,510,417 B1 | 1/2003 | Woods et al. | 704/275 |
| 6,513,006 B2 | 1/2003 | Howard et al. | 704/257 |
| 6,522,746 B1 | 2/2003 | Marchok et al. | 379/406.03 |
| 6,523,061 B1 | 2/2003 | Halverson et al. | 709/202 |
| 6,532,444 B1 | 3/2003 | Weber | 704/257 |
| 6,539,348 B1 | 3/2003 | Bond et al. | 704/9 |
| 6,549,629 B2 | 4/2003 | Finn et al. | 381/92 |
| 6,553,372 B1 | 4/2003 | Brassell et al. | 707/5 |
| 6,556,970 B1 * | 4/2003 | Sasaki | G01C 21/3608 382/100 |
| 6,556,973 B1 | 4/2003 | Lewin | 704/277 |
| 6,560,576 B1 | 5/2003 | Cohen et al. | 704/270 |
| 6,560,590 B1 | 5/2003 | Shwe et al. | 706/55 |
| 6,567,778 B1 | 5/2003 | Chao Chang et al. | 704/257 |
| 6,567,797 B1 | 5/2003 | Schuetze et al. | 707/2 |
| 6,567,805 B1 | 5/2003 | Johnson | |
| 6,570,555 B1 | 5/2003 | Prevost et al. | 345/156 |
| 6,570,964 B1 | 5/2003 | Murveit et al. | 379/67.1 |
| 6,571,279 B1 | 5/2003 | Herz et al. | 709/217 |
| 6,574,597 B1 | 6/2003 | Mohri et al. | 704/251 |
| 6,574,624 B1 | 6/2003 | Johnson et al. | 707/5 |
| 6,578,022 B1 | 6/2003 | Foulger et al. | 706/45 |
| 6,581,103 B1 | 6/2003 | Dengler | 709/231 |
| 6,584,439 B1 | 6/2003 | Geilhufe et al. | 704/270 |
| 6,587,858 B1 | 7/2003 | Strazza | 707/102 |
| 6,591,185 B1 | 7/2003 | Polidi | |
| 6,591,239 B1 | 7/2003 | McCall et al. | 704/275 |
| 6,594,257 B1 | 7/2003 | Doshi et al. | 370/352 |
| 6,594,367 B1 | 7/2003 | Marash et al. | 381/92 |
| 6,598,018 B1 | 7/2003 | Junqua | 704/251 |
| 6,601,026 B2 | 7/2003 | Appelt et al. | 704/9 |
| 6,601,029 B1 * | 7/2003 | Pickering | G10L 15/22 704/257 |
| 6,604,075 B1 | 8/2003 | Brown et al. | 704/270.1 |
| 6,604,077 B2 | 8/2003 | Dragosh et al. | 704/270.1 |
| 6,606,598 B1 | 8/2003 | Holthouse et al. | 704/275 |
| 6,611,692 B2 | 8/2003 | Raffel et al. | 455/552 |
| 6,614,773 B1 | 9/2003 | Maxemchuk | 370/337 |
| 6,615,172 B1 | 9/2003 | Bennett et al. | 704/257 |
| 6,622,119 B1 | 9/2003 | Ramaswamy et al. | 704/9 |
| 6,629,066 B1 | 9/2003 | Jackson et al. | 704/9 |
| 6,631,346 B1 | 10/2003 | Karaorman et al. | 704/9 |
| 6,631,351 B1 | 10/2003 | Ramachandran et al. | 704/270 |
| 6,633,846 B1 | 10/2003 | Bennett et al. | 704/257 |
| 6,636,790 B1 | 10/2003 | Lightner et al. | 701/33 |
| 6,643,620 B1 | 11/2003 | Contolini et al. | 704/270 |
| 6,647,363 B2 | 11/2003 | Claassen | 704/1 |
| 6,650,747 B1 | 11/2003 | Bala et al. | 379/265.06 |
| 6,658,388 B1 * | 12/2003 | Kleindienst | G10L 13/00 704/270 |
| 6,678,680 B1 | 1/2004 | Woo | 707/6 |
| 6,681,206 B1 | 1/2004 | Gorin et al. | 704/243 |
| 6,691,151 B1 | 2/2004 | Cheyer et al. | 709/202 |
| 6,701,294 B1 | 3/2004 | Ball et al. | 704/257 |
| 6,704,396 B2 | 3/2004 | Parolkar et al. | 379/88.17 |
| 6,704,576 B1 | 3/2004 | Brachman et al. | 455/503 |
| 6,704,708 B1 | 3/2004 | Pickering | 704/235 |
| 6,707,421 B1 | 3/2004 | Drury et al. | 342/357.1 |
| 6,708,150 B1 | 3/2004 | Hirayama et al. | 704/243 |
| 6,721,001 B1 | 4/2004 | Berstis | 348/231.3 |

(56) References Cited

U.S. PATENT DOCUMENTS

| | | | |
|---|---|---|---|
| 6,721,633 B2 | 4/2004 | Funk et al. ................... 701/1 |
| 6,721,706 B1* | 4/2004 | Strubbe ............... G10L 15/18 |
| | | | 704/257 |
| 6,726,636 B2 | 4/2004 | Der Ghazarian et al. .... 600/532 |
| 6,732,088 B1* | 5/2004 | Glance ........... G06F 17/30864 |
| 6,735,592 B1 | 5/2004 | Neumann et al. ........... 707/101 |
| 6,739,556 B1 | 5/2004 | Langston .................... 244/189 |
| 6,741,931 B1 | 5/2004 | Kohut et al. ................ 701/209 |
| 6,742,021 B1 | 5/2004 | Halverson et al. .......... 709/218 |
| 6,745,161 B1 | 6/2004 | Arnold et al. .................. 704/7 |
| 6,751,591 B1* | 6/2004 | Gorin ................... G10L 15/22 |
| | | | 379/88.01 |
| 6,751,612 B1 | 6/2004 | Schuetze et al. ................. 707/4 |
| 6,754,485 B1 | 6/2004 | Obradovich et al. ...... 455/414.1 |
| 6,754,627 B2 | 6/2004 | Woodward .................. 704/235 |
| 6,754,647 B1* | 6/2004 | Tackett ............... G06F 17/279 |
| | | | 700/246 |
| 6,757,544 B2 | 6/2004 | Rangarajan et al. ...... 455/456.1 |
| 6,757,718 B1 | 6/2004 | Halverson et al. .......... 709/218 |
| 6,785,651 B1* | 8/2004 | Wang ................. G06F 9/4446 |
| | | | 379/88.01 |
| 6,795,808 B1 | 9/2004 | Strubbe et al. .............. 704/275 |
| 6,801,604 B2 | 10/2004 | Maes et al. ............... 379/88.17 |
| 6,801,893 B1 | 10/2004 | Backfried et al. ........... 704/257 |
| 6,804,330 B1* | 10/2004 | Jones ................ H04M 3/4938 |
| | | | 379/88.01 |
| 6,810,375 B1 | 10/2004 | Ejerhed |
| 6,813,341 B1 | 11/2004 | Mahoney ................... 379/88.01 |
| 6,816,830 B1 | 11/2004 | Kempe |
| 6,823,308 B2* | 11/2004 | Keiller ................. G10L 15/32 |
| | | | 704/236 |
| 6,829,603 B1 | 12/2004 | Chai et al. ...................... 707/5 |
| 6,832,230 B1 | 12/2004 | Zilliacus et al. ............. 707/10 |
| 6,833,848 B1 | 12/2004 | Wolff et al. .................. 345/719 |
| 6,850,603 B1 | 2/2005 | Eberle et al. .............. 379/88.16 |
| 6,856,990 B2 | 2/2005 | Barile et al. .................. 707/10 |
| 6,865,481 B2 | 3/2005 | Kawazoe et al. ............ 701/211 |
| 6,868,380 B2 | 3/2005 | Kroeker ...................... 704/240 |
| 6,868,385 B1 | 3/2005 | Gerson ........................ 704/275 |
| 6,871,179 B1 | 3/2005 | Kist |
| 6,873,837 B1 | 3/2005 | Yoshioka et al. ............. 455/321 |
| 6,877,001 B2 | 4/2005 | Wolf et al. ...................... 707/3 |
| 6,877,134 B1 | 4/2005 | Fuller et al. ................ 715/500.1 |
| 6,882,970 B1* | 4/2005 | Garner ............. G06F 17/30746 |
| | | | 704/236 |
| 6,901,366 B1 | 5/2005 | Kuhn et al. .................. 704/275 |
| 6,910,003 B1 | 6/2005 | Arnold et al. ................... 704/4 |
| 6,912,498 B2 | 6/2005 | Stevens et al. .............. 704/235 |
| 6,915,126 B2 | 7/2005 | Mazzara, Jr. ................ 455/411 |
| 6,928,614 B1 | 8/2005 | Everhart ...................... 715/728 |
| 6,934,756 B2 | 8/2005 | Maes ........................... 709/227 |
| 6,937,977 B2 | 8/2005 | Gerson ........................ 704/201 |
| 6,937,982 B2 | 8/2005 | Kitaoka et al. .............. 704/252 |
| 6,941,266 B1 | 9/2005 | Gorin et al. ................. 704/257 |
| 6,944,594 B2 | 9/2005 | Busayapongchai et al. ................ |
| | | | 704/275 |
| 6,950,821 B2 | 9/2005 | Faybishenko et al. ......... 707/10 |
| 6,954,755 B2 | 10/2005 | Reisman ........................ 707/10 |
| 6,959,276 B2 | 10/2005 | Droppo et al. ............... 704/226 |
| 6,961,700 B2 | 11/2005 | Mitchell et al. ............. 704/235 |
| 6,963,759 B1 | 11/2005 | Gerson ......................... 455/563 |
| 6,964,023 B2 | 11/2005 | Maes et al. ................... 715/811 |
| 6,968,311 B2 | 11/2005 | Knockeart et al. ........... 704/270 |
| 6,973,387 B2 | 12/2005 | Masclet et al. .............. 701/211 |
| 6,975,983 B1* | 12/2005 | Fortescue ............... G06F 3/038 |
| | | | 704/257 |
| 6,975,993 B1 | 12/2005 | Keiller ........................ 704/275 |
| 6,980,092 B2 | 12/2005 | Turnbull et al. ........... 340/425.5 |
| 6,983,055 B2 | 1/2006 | Luo ............................. 381/313 |
| 6,990,513 B2 | 1/2006 | Belfiore et al. .............. 709/203 |
| 6,996,531 B2 | 2/2006 | Korall et al. ................. 704/270 |
| 7,003,463 B1 | 2/2006 | Maes et al. ............... 704/270.1 |
| 7,016,849 B2 | 3/2006 | Arnold et al. ............... 704/275 |
| 7,020,609 B2 | 3/2006 | Thrift et al. ............... 704/270.1 |
| 7,024,364 B2 | 4/2006 | Guerra et al. ................ 704/270 |
| 7,027,586 B2 | 4/2006 | Bushey et al. ........... 379/265.09 |
| 7,027,974 B1 | 4/2006 | Busch |
| 7,027,975 B1 | 4/2006 | Pazandak et al. ................ 704/9 |
| 7,031,908 B1 | 4/2006 | Huang |
| 7,035,415 B2 | 4/2006 | Belt et al. ....................... 381/92 |
| 7,036,128 B1 | 4/2006 | Julia et al. ................... 719/317 |
| 7,043,425 B2 | 5/2006 | Pao ............................. 704/211 |
| 7,054,817 B2 | 5/2006 | Shao ............................ 704/270 |
| 7,058,890 B2 | 6/2006 | George et al. ................ 715/728 |
| 7,062,488 B1 | 6/2006 | Reisman .......................... 707/8 |
| 7,069,220 B2 | 6/2006 | Coffman et al. ............ 704/275 |
| 7,072,834 B2 | 7/2006 | Zhou ............................ 704/244 |
| 7,072,888 B1* | 7/2006 | Perkins ............. G06F 17/30867 |
| | | | 707/733 |
| 7,076,362 B2 | 7/2006 | Ohtsuji et al. ................ 701/211 |
| 7,082,469 B2 | 7/2006 | Gold et al. ................... 709/231 |
| 7,085,708 B2 | 8/2006 | Manson ........................... 704/9 |
| 7,092,928 B1 | 8/2006 | Elad et al. ...................... 706/60 |
| 7,107,210 B2 | 9/2006 | Deng et al. .................. 704/226 |
| 7,107,218 B1 | 9/2006 | Preston ....................... 704/270 |
| 7,110,951 B1 | 9/2006 | Lemelson et al. ........... 704/270 |
| 7,127,395 B1 | 10/2006 | Gorin et al. ................. 704/257 |
| 7,127,400 B2 | 10/2006 | Koch ......................... 704/270.1 |
| 7,130,390 B2 | 10/2006 | Abburi ...................... 379/88.17 |
| 7,136,875 B2 | 11/2006 | Anderson et al. ......... 707/104.1 |
| 7,137,126 B1* | 11/2006 | Coffman .......... G06F 17/30899 |
| | | | 704/200 |
| 7,143,037 B1 | 11/2006 | Chestnut ...................... 704/251 |
| 7,143,039 B1 | 11/2006 | Stifelman et al. ............ 704/270 |
| 7,146,315 B2* | 12/2006 | Balan ..................... G10L 25/78 |
| | | | 704/233 |
| 7,146,319 B2 | 12/2006 | Hunt ............................ 704/254 |
| 7,149,696 B2 | 12/2006 | Shimizu et al. .................. 705/1 |
| 7,165,028 B2 | 1/2007 | Gong ........................... 704/233 |
| 7,170,993 B2 | 1/2007 | Anderson et al. ........ 379/265.09 |
| 7,171,291 B2 | 1/2007 | Obradovich ................... 701/29 |
| 7,174,300 B2 | 2/2007 | Bush ........................... 704/275 |
| 7,177,798 B2 | 2/2007 | Hsu et al. ........................ 704/9 |
| 7,184,957 B2 | 2/2007 | Brookes et al. ............. 704/246 |
| 7,190,770 B2 | 3/2007 | Ando et al. ................ 379/88.01 |
| 7,197,069 B2 | 3/2007 | Agazzi et al. ................ 375/233 |
| 7,197,460 B1 | 3/2007 | Gupta et al. ............... 704/270.1 |
| 7,203,644 B2 | 4/2007 | Anderson et al. ............ 704/246 |
| 7,206,418 B2 | 4/2007 | Yang et al. ..................... 381/92 |
| 7,207,011 B2 | 4/2007 | Mulvey et al. ............... 715/812 |
| 7,215,941 B2 | 5/2007 | Beckmann et al. ........ 455/404.1 |
| 7,228,276 B2 | 6/2007 | Omote et al. ................. 704/243 |
| 7,231,343 B1 | 6/2007 | Treadgold et al. ............... 704/9 |
| 7,236,923 B1 | 6/2007 | Gupta ............................... 704/9 |
| 7,254,482 B2 | 8/2007 | Kawasaki et al. ............ 701/211 |
| 7,272,212 B2 | 9/2007 | Eberle et al. .............. 379/88.17 |
| 7,277,854 B2 | 10/2007 | Bennett et al. ............... 704/257 |
| 7,283,829 B2 | 10/2007 | Christenson et al. ........ 455/461 |
| 7,283,951 B2 | 10/2007 | Marchisio et al. ................ 704/9 |
| 7,289,606 B2 | 10/2007 | Sibal et al. ..................... 379/52 |
| 7,299,186 B2 | 11/2007 | Kuzunuki et al. .......... 704/270.1 |
| 7,301,093 B2 | 11/2007 | Sater et al. ...................... 84/615 |
| 7,305,381 B1 | 12/2007 | Poppink et al. |
| 7,321,850 B2 | 1/2008 | Wakita .......................... 704/10 |
| 7,328,155 B2 | 2/2008 | Endo et al. ................... 704/251 |
| 7,337,116 B2 | 2/2008 | Charlesworth et al. ...... 704/254 |
| 7,340,040 B1 | 3/2008 | Saylor et al. ............... 379/67.1 |
| 7,366,285 B2 | 4/2008 | Parolkar et al. ........... 379/88.17 |
| 7,366,669 B2 | 4/2008 | Nishitani et al. ............ 704/256 |
| 7,376,645 B2 | 5/2008 | Bernard .......................... 707/3 |
| 7,380,250 B2 | 5/2008 | Schechter |
| 7,386,443 B1 | 6/2008 | Parthasarathy et al. ...... 704/201 |
| 7,398,209 B2 | 7/2008 | Kennewick et al. ......... 704/255 |
| 7,406,421 B2 | 7/2008 | Odinak et al. ............... 704/275 |
| 7,415,100 B2 | 8/2008 | Cooper |
| 7,415,414 B2 | 8/2008 | Azara et al. .................. 704/270 |
| 7,421,393 B1 | 9/2008 | Di Fabbrizio et al. ....... 704/275 |
| 7,424,431 B2 | 9/2008 | Greene et al. ................ 704/270 |
| 7,447,635 B1 | 11/2008 | Konopka et al. ............ 704/275 |
| 7,451,088 B1 | 11/2008 | Ehlen et al. ............... 704/270.1 |
| 7,454,368 B2 | 11/2008 | Stillman |
| 7,454,608 B2 | 11/2008 | Gopalakrishnan et al. .. 713/100 |
| 7,461,059 B2 | 12/2008 | Richardson et al. ............. 707/5 |

(56) References Cited

U.S. PATENT DOCUMENTS

| | | | |
|---|---|---|---|
| 7,472,020 B2 | 12/2008 | Brulle-Drews | 701/211 |
| 7,472,060 B1 | 12/2008 | Gorin et al. | 704/240 |
| 7,472,075 B2 | 12/2008 | Odinak et al. | 705/26 |
| 7,477,909 B2 | 1/2009 | Roth | 455/466 |
| 7,478,036 B2 | 1/2009 | Shen et al. | 704/9 |
| 7,487,088 B1 | 2/2009 | Gorin et al. | 704/240 |
| 7,487,110 B2 | 2/2009 | Bennett et al. | 705/26 |
| 7,493,259 B2 | 2/2009 | Jones et al. | 704/270 |
| 7,493,559 B1 | 2/2009 | Wolff et al. | 715/727 |
| 7,502,672 B1 | 3/2009 | Kolls | 701/29 |
| 7,502,730 B2 | 3/2009 | Wang | |
| 7,502,738 B2 | 3/2009 | Kennewick et al. | 704/257 |
| 7,512,906 B1 | 3/2009 | Baier | |
| 7,516,076 B2 | 4/2009 | Walker et al. | 704/275 |
| 7,529,675 B2 | 5/2009 | Maes | 704/270.1 |
| 7,536,297 B2 | 5/2009 | Byrd et al. | 704/10 |
| 7,536,374 B2 | 5/2009 | Au | 706/55 |
| 7,542,894 B2 | 6/2009 | Murata | 704/9 |
| 7,546,382 B2 | 6/2009 | Healey et al. | 709/246 |
| 7,548,491 B2 | 6/2009 | Macfarlane | 367/198 |
| 7,552,054 B1 | 6/2009 | Stifelman et al. | 704/270 |
| 7,558,730 B2 | 7/2009 | Davis et al. | 704/235 |
| 7,574,362 B2 | 8/2009 | Walker et al. | 704/275 |
| 7,577,244 B2 | 8/2009 | Taschereau | 379/218.01 |
| 7,606,708 B2 | 10/2009 | Hwang | 704/257 |
| 7,606,712 B1 * | 10/2009 | Smith | G06F 3/167 704/270.1 |
| 7,620,549 B2 | 11/2009 | Di Cristo et al. | 704/257 |
| 7,634,409 B2 | 12/2009 | Kennewick et al. | 704/257 |
| 7,640,006 B2 | 12/2009 | Portman et al. | 455/412.1 |
| 7,640,160 B2 | 12/2009 | Di Cristo et al. | 704/257 |
| 7,640,272 B2 | 12/2009 | Mahajan et al. | 707/104.1 |
| 7,672,931 B2 | 3/2010 | Hurst-Hiller | |
| 7,676,365 B2 | 3/2010 | Hwang et al. | 704/240 |
| 7,676,369 B2 | 3/2010 | Fujimoto et al. | 704/270 |
| 7,684,977 B2 | 3/2010 | Morikawa | 704/211 |
| 7,693,720 B2 | 4/2010 | Kennewick et al. | 704/275 |
| 7,697,673 B2 | 4/2010 | Chiu | |
| 7,706,616 B2 | 4/2010 | Kristensson | |
| 7,729,913 B1 * | 6/2010 | Lee | G06F 17/30654 704/251 |
| 7,729,916 B2 | 6/2010 | Coffman et al. | 704/270 |
| 7,729,918 B2 | 6/2010 | Walker et al. | 704/275 |
| 7,729,920 B2 | 6/2010 | Cheer et al. | 704/275 |
| 7,734,287 B2 | 6/2010 | Ying | 455/423 |
| 7,748,021 B2 | 6/2010 | Obradovich | 725/105 |
| 7,788,084 B2 | 8/2010 | Brun et al. | 704/7 |
| 7,792,257 B1 | 9/2010 | Vanier | |
| 7,801,731 B2 | 9/2010 | Odinak et al. | 704/275 |
| 7,809,570 B2 | 10/2010 | Kennewick et al. | 704/257 |
| 7,818,176 B2 | 10/2010 | Freeman et al. | 704/270 |
| 7,831,426 B2 | 11/2010 | Bennett | 704/252 |
| 7,831,433 B1 | 11/2010 | Belvin et al. | 704/275 |
| 7,856,358 B2 | 12/2010 | Ho | 704/270 |
| 7,873,519 B2 | 1/2011 | Bennett | 704/257 |
| 7,873,523 B2 | 1/2011 | Potter et al. | 704/275 |
| 7,873,654 B2 | 1/2011 | Bernard | 707/769 |
| 7,881,936 B2 | 2/2011 | Longe et al. | 704/257 |
| 7,890,324 B2 | 2/2011 | Bangalore et al. | 704/231 |
| 7,894,849 B2 | 2/2011 | Kass et al. | 455/550.1 |
| 7,902,969 B2 | 3/2011 | Obradovich | 340/439 |
| 7,917,367 B2 | 3/2011 | Di Cristo et al. | 704/270.1 |
| 7,920,682 B2 | 4/2011 | Byrne et al. | 379/88.18 |
| 7,949,529 B2 | 5/2011 | Weider et al. | 704/270 |
| 7,949,537 B2 | 5/2011 | Walker et al. | 704/275 |
| 7,953,732 B2 | 5/2011 | Frank et al. | 707/724 |
| 7,974,875 B1 | 7/2011 | Quilici et al. | 705/14.4 |
| 7,983,917 B2 | 7/2011 | Kennewick et al. | 704/257 |
| 7,984,287 B2 | 7/2011 | Gopalakrishnan et al. | 713/100 |
| 8,005,683 B2 | 8/2011 | Tessel et al. | 704/275 |
| 8,015,006 B2 | 9/2011 | Kennewick et al. | 704/236 |
| 8,024,186 B1 | 9/2011 | De Bonet | |
| 8,027,965 B2 | 9/2011 | Takehara | |
| 8,032,383 B1 | 10/2011 | Bhardwaj | |
| 8,060,367 B2 | 11/2011 | Keaveney | 704/247 |
| 8,069,046 B2 | 11/2011 | Kennewick et al. | 704/257 |
| 8,073,681 B2 | 12/2011 | Baldwin et al. | 704/9 |
| 8,077,975 B2 | 12/2011 | Ma et al. | 382/187 |
| 8,082,153 B2 | 12/2011 | Coffman et al. | 704/270 |
| 8,086,463 B2 | 12/2011 | Ativanichayaphong et al. | 704/275 |
| 8,103,510 B2 | 1/2012 | Sato | |
| 8,112,275 B2 | 2/2012 | Kennewick et al. | 704/240 |
| 8,140,327 B2 | 3/2012 | Kennewick et al. | 704/226 |
| 8,140,335 B2 | 3/2012 | Kennewick et al. | 704/257 |
| 8,145,489 B2 | 3/2012 | Freeman et al. | 704/257 |
| 8,150,694 B2 | 4/2012 | Kennewick et al. | 704/257 |
| 8,155,962 B2 | 4/2012 | Kennewick et al. | 704/257 |
| 8,170,867 B2 | 5/2012 | Germain | 704/9 |
| 8,180,037 B1 | 5/2012 | Delker | |
| 8,195,468 B2 | 6/2012 | Weider et al. | 704/275 |
| 8,200,485 B1 | 6/2012 | Lee et al. | 704/231 |
| 8,204,751 B1 * | 6/2012 | Di Fabbrizio | G06F 17/271 704/256 |
| 8,219,399 B2 | 7/2012 | Lutz et al. | 704/270 |
| 8,219,599 B2 | 7/2012 | Tunstall-Pedoe | 707/955 |
| 8,224,652 B2 | 7/2012 | Wang et al. | 704/275 |
| 8,255,224 B2 | 8/2012 | Singleton et al. | 704/275 |
| 8,326,599 B2 | 12/2012 | Tomeh | |
| 8,326,627 B2 | 12/2012 | Kennewick et al. | 704/257 |
| 8,326,634 B2 | 12/2012 | Di Cristo et al. | 704/270.1 |
| 8,326,637 B2 | 12/2012 | Baldwin et al. | 704/275 |
| 8,332,224 B2 | 12/2012 | Di Cristo et al. | 704/257 |
| 8,340,975 B1 | 12/2012 | Rosenberger | |
| 8,346,563 B1 | 1/2013 | Hjelm | |
| 8,370,147 B2 | 2/2013 | Kennewick et al. | 704/257 |
| 8,447,607 B2 | 5/2013 | Weider et al. | 704/250 |
| 8,447,651 B1 | 5/2013 | Scholl | |
| 8,452,598 B2 | 5/2013 | Kennewick et al. | 704/257 |
| 8,503,995 B2 | 8/2013 | Ramer | |
| 8,509,403 B2 | 8/2013 | Chiu et al. | 379/114.13 |
| 8,515,765 B2 | 8/2013 | Baldwin et al. | 704/275 |
| 8,527,274 B2 | 9/2013 | Freeman et al. | 704/257 |
| 8,577,671 B1 | 11/2013 | Barve | |
| 8,589,161 B2 | 11/2013 | Kennewick et al. | 704/252 |
| 8,612,205 B2 | 12/2013 | Hanneman | |
| 8,612,206 B2 | 12/2013 | Chalabi | |
| 8,620,659 B2 | 12/2013 | Di Cristo et al. | 704/257 |
| 8,719,005 B1 | 5/2014 | Lee | |
| 8,719,009 B2 | 5/2014 | Baldwin et al. | 704/9 |
| 8,719,026 B2 | 5/2014 | Kennewick et al. | 704/257 |
| 8,731,929 B2 | 5/2014 | Kennewick et al. | 704/257 |
| 8,738,380 B2 | 5/2014 | Baldwin et al. | 704/257 |
| 8,849,652 B2 | 9/2014 | Weider et al. | 704/9 |
| 8,849,670 B2 | 9/2014 | Di Cristo et al. | 704/270.1 |
| 8,849,696 B2 | 9/2014 | Pansari | |
| 8,849,791 B1 | 9/2014 | Hertschuh | |
| 8,886,536 B2 | 11/2014 | Freeman et al. | 704/257 |
| 8,972,243 B1 | 3/2015 | Strom | |
| 8,983,839 B2 | 3/2015 | Kennewick et al. | 704/254 |
| 9,009,046 B1 | 4/2015 | Stewart | |
| 9,015,049 B2 | 4/2015 | Baldwin | |
| 9,037,455 B1 | 5/2015 | Faaborg | |
| 9,070,366 B1 | 6/2015 | Mathias | |
| 9,070,367 B1 * | 6/2015 | Hoffmeister | G10L 15/187 |
| 9,105,266 B2 | 8/2015 | Baldwin | |
| 9,171,541 B2 | 10/2015 | Kennewick | |
| 9,269,097 B2 | 2/2016 | Freeman | |
| 9,305,548 B2 | 4/2016 | Kennewick | |
| 9,308,445 B1 | 4/2016 | Merzenich | |
| 9,318,108 B2 | 4/2016 | Gruber | |
| 9,406,078 B2 | 8/2016 | Freeman | |
| 9,443,514 B1 * | 9/2016 | Taubman | G10L 15/22 |
| 9,502,025 B2 | 11/2016 | Kennewick | |
| 2001/0021905 A1 * | 9/2001 | Burnett | A61B 5/0507 704/233 |
| 2001/0039492 A1 | 11/2001 | Nemoto | 704/231 |
| 2001/0041980 A1 | 11/2001 | Howard et al. | 704/270 |
| 2001/0047261 A1 * | 11/2001 | Kassan | G10L 15/30 704/270 |
| 2001/0049601 A1 | 12/2001 | Kroeker et al. | 704/254 |
| 2001/0054087 A1 | 12/2001 | Flom et al. | 709/218 |
| 2002/0002548 A1 * | 1/2002 | Roundtree | G06F 17/30014 |

(56) References Cited

U.S. PATENT DOCUMENTS

| | | | |
|---|---|---|---|
| 2002/0007267 A1* | 1/2002 | Batchilo | G06F 17/30663 704/9 |
| 2002/0010584 A1 | 1/2002 | Schultz | |
| 2002/0015500 A1 | 2/2002 | Belt et al. | 381/66 |
| 2002/0022927 A1 | 2/2002 | Lemelson et al. | 701/301 |
| 2002/0022956 A1 | 2/2002 | Ukrainczyk | |
| 2002/0029186 A1 | 3/2002 | Roth | |
| 2002/0029261 A1 | 3/2002 | Shibata | 709/219 |
| 2002/0032752 A1 | 3/2002 | Gold et al. | 709/218 |
| 2002/0035501 A1 | 3/2002 | Handel et al. | 705/10 |
| 2002/0040297 A1 | 4/2002 | Tsiao et al. | 704/257 |
| 2002/0049535 A1 | 4/2002 | Rigo et al. | 701/211 |
| 2002/0049805 A1 | 4/2002 | Yamada et al. | 709/202 |
| 2002/0059068 A1 | 5/2002 | Rose et al. | 704/246 |
| 2002/0065568 A1 | 5/2002 | Silfvast et al. | 700/94 |
| 2002/0067839 A1 | 6/2002 | Heinrich | 381/110 |
| 2002/0069059 A1 | 6/2002 | Smith | 704/257 |
| 2002/0069071 A1 | 6/2002 | Knockeart et al. | 704/275 |
| 2002/0073176 A1 | 6/2002 | Ikeda | |
| 2002/0082911 A1 | 6/2002 | Dunn et al. | 705/14 |
| 2002/0087312 A1* | 7/2002 | Lee | G06Q 30/06 704/251 |
| 2002/0087326 A1 | 7/2002 | Lee et al. | 704/270.1 |
| 2002/0087525 A1 | 7/2002 | Abbott et al. | 707/3 |
| 2002/0107694 A1 | 8/2002 | Lerg | 704/273 |
| 2002/0120609 A1 | 8/2002 | Lang et al. | 707/1 |
| 2002/0124050 A1 | 9/2002 | Middeljans | 709/203 |
| 2002/0133347 A1* | 9/2002 | Schoneburg | G06F 17/27 704/257 |
| 2002/0133354 A1* | 9/2002 | Ross | G10L 15/30 704/275 |
| 2002/0133402 A1 | 9/2002 | Faber et al. | 705/14 |
| 2002/0135618 A1* | 9/2002 | Maes | G06F 3/0481 715/767 |
| 2002/0138248 A1 | 9/2002 | Corston-Oliver et al. | 704/1 |
| 2002/0143532 A1 | 10/2002 | McLean et al. | 704/235 |
| 2002/0143535 A1 | 10/2002 | Kist et al. | 704/251 |
| 2002/0152260 A1 | 10/2002 | Chen | |
| 2002/0161646 A1 | 10/2002 | Gailey et al. | 705/14 |
| 2002/0161647 A1 | 10/2002 | Gailey | |
| 2002/0169597 A1* | 11/2002 | Fain | G10L 15/22 704/9 |
| 2002/0173333 A1 | 11/2002 | Buchholz et al. | 455/527 |
| 2002/0173961 A1 | 11/2002 | Guerra | 704/258 |
| 2002/0178003 A1* | 11/2002 | Gehrke | G10L 15/30 704/246 |
| 2002/0184373 A1 | 12/2002 | Maes | 709/228 |
| 2002/0188455 A1* | 12/2002 | Shioda | G10L 17/26 704/275 |
| 2002/0188602 A1 | 12/2002 | Stubler et al. | 707/3 |
| 2002/0198714 A1 | 12/2002 | Zhou | 704/252 |
| 2003/0005033 A1* | 1/2003 | Mohan | G06F 17/30899 709/202 |
| 2003/0014261 A1 | 1/2003 | Kageyama | 704/275 |
| 2003/0016835 A1 | 1/2003 | Elko et al. | 381/92 |
| 2003/0036903 A1* | 2/2003 | Konopka | G10L 15/065 704/249 |
| 2003/0046071 A1* | 3/2003 | Wyman | G10L 15/22 704/235 |
| 2003/0046281 A1* | 3/2003 | Son | G06F 17/30876 |
| 2003/0046346 A1 | 3/2003 | Mumick et al. | 709/205 |
| 2003/0064709 A1 | 4/2003 | Gailey et al. | 455/412 |
| 2003/0065427 A1 | 4/2003 | Funk et al. | 701/1 |
| 2003/0069734 A1 | 4/2003 | Everhart | 704/275 |
| 2003/0069880 A1 | 4/2003 | Harrison | |
| 2003/0088421 A1 | 5/2003 | Maes et al. | 704/270.1 |
| 2003/0093419 A1* | 5/2003 | Bangalore | G01C 21/3664 |
| 2003/0097249 A1 | 5/2003 | Walker et al. | 704/1 |
| 2003/0110037 A1 | 6/2003 | Walker et al. | 704/257 |
| 2003/0112267 A1 | 6/2003 | Belrose | 345/728 |
| 2003/0115062 A1 | 6/2003 | Walker et al. | 704/258 |
| 2003/0120493 A1 | 6/2003 | Gupta | 704/270.1 |
| 2003/0135488 A1 | 7/2003 | Amir et al. | 707/3 |
| 2003/0144846 A1 | 7/2003 | Denenberg et al. | 704/277 |
| 2003/0158731 A1 | 8/2003 | Falcon et al. | 704/231 |
| 2003/0161448 A1 | 8/2003 | Parolkar et al. | 379/88.17 |
| 2003/0167167 A1* | 9/2003 | Gong | G10L 15/22 704/250 |
| 2003/0174155 A1 | 9/2003 | Weng | |
| 2003/0182132 A1 | 9/2003 | Niemoeller | 704/275 |
| 2003/0187643 A1 | 10/2003 | VanThong | |
| 2003/0204492 A1 | 10/2003 | Wolf et al. | 707/3 |
| 2003/0206640 A1 | 11/2003 | Malvar et al. | 381/93 |
| 2003/0212550 A1 | 11/2003 | Ubale | 704/215 |
| 2003/0212558 A1 | 11/2003 | Matula | 704/260 |
| 2003/0212562 A1 | 11/2003 | Patel et al. | 704/275 |
| 2003/0225825 A1 | 12/2003 | Healey et al. | 709/203 |
| 2003/0233230 A1* | 12/2003 | Ammicht | G10L 15/183 704/235 |
| 2003/0236664 A1 | 12/2003 | Sharma | 704/251 |
| 2004/0006475 A1* | 1/2004 | Ehlen | G10L 15/22 704/270.1 |
| 2004/0010358 A1 | 1/2004 | Oesterling et al. | 701/49 |
| 2004/0025115 A1 | 2/2004 | Sienel et al. | 715/513 |
| 2004/0030741 A1 | 2/2004 | Wolton | |
| 2004/0036601 A1 | 2/2004 | Obradovich | |
| 2004/0044516 A1* | 3/2004 | Kennewick | G10L 15/22 704/5 |
| 2004/0093567 A1 | 5/2004 | Schabes | |
| 2004/0098245 A1 | 5/2004 | Walker et al. | 704/1 |
| 2004/0102977 A1 | 5/2004 | Metzler | |
| 2004/0117179 A1 | 6/2004 | Balasuriya | 704/231 |
| 2004/0117804 A1 | 6/2004 | Scahill et al. | 719/320 |
| 2004/0122673 A1* | 6/2004 | Park | G10L 15/24 704/270 |
| 2004/0122674 A1 | 6/2004 | Bangalore et al. | 704/276 |
| 2004/0133793 A1 | 7/2004 | Ginter | |
| 2004/0140989 A1 | 7/2004 | Papageorge | 345/700 |
| 2004/0143440 A1 | 7/2004 | Prasad | |
| 2004/0148154 A1 | 7/2004 | Acero | |
| 2004/0148170 A1 | 7/2004 | Acero | |
| 2004/0158555 A1 | 8/2004 | Seedman et al. | 707/3 |
| 2004/0166832 A1 | 8/2004 | Portman et al. | 455/412.1 |
| 2004/0167771 A1 | 8/2004 | Duan et al. | 704/10 |
| 2004/0172247 A1 | 9/2004 | Yoon | |
| 2004/0172258 A1 | 9/2004 | Dominach et al. | 704/277 |
| 2004/0189697 A1 | 9/2004 | Fukuoka | |
| 2004/0193408 A1 | 9/2004 | Hunt | 704/209 |
| 2004/0193420 A1* | 9/2004 | Kennewick | G06F 17/30654 704/257 |
| 2004/0199375 A1 | 10/2004 | Ehsani et al. | 704/4 |
| 2004/0199389 A1* | 10/2004 | Geiger | G10L 15/16 704/254 |
| 2004/0201607 A1* | 10/2004 | Mulvey | G06F 3/0237 715/708 |
| 2004/0204939 A1* | 10/2004 | Liu | G10L 15/28 704/239 |
| 2004/0205671 A1 | 10/2004 | Sukehiro et al. | 715/532 |
| 2004/0220800 A1* | 11/2004 | Kong | G10L 21/0208 704/205 |
| 2004/0243393 A1* | 12/2004 | Wang | G10L 15/22 704/9 |
| 2004/0243417 A9 | 12/2004 | Pitts, III et al. | 704/276 |
| 2004/0247092 A1 | 12/2004 | Timmins | |
| 2004/0249636 A1* | 12/2004 | Applebaum | G10L 15/1822 704/231 |
| 2005/0015256 A1 | 1/2005 | Kargman | 704/272 |
| 2005/0021331 A1 | 1/2005 | Huang et al. | 704/231 |
| 2005/0021334 A1 | 1/2005 | Iwahashi | 704/240 |
| 2005/0021470 A1 | 1/2005 | Martin et al. | 705/51 |
| 2005/0021826 A1 | 1/2005 | Kumar | 709/232 |
| 2005/0033574 A1 | 2/2005 | Kim et al. | 704/251 |
| 2005/0033582 A1 | 2/2005 | Gadd et al. | 704/277 |
| 2005/0043940 A1 | 2/2005 | Elder | 704/9 |
| 2005/0060142 A1* | 3/2005 | Visser | G10L 21/0208 704/201 |
| 2005/0080632 A1 | 4/2005 | Endo et al. | 704/277 |
| 2005/0102282 A1* | 5/2005 | Linden | G06F 17/3053 |
| 2005/0114116 A1 | 5/2005 | Fiedler | 704/201 |
| 2005/0125232 A1 | 6/2005 | Gadd | 704/270.1 |
| 2005/0131673 A1 | 6/2005 | Koizumi et al. | 704/2 |
| 2005/0137850 A1 | 6/2005 | Odell | 704/4 |

(56) References Cited

U.S. PATENT DOCUMENTS

| | | | |
|---|---|---|---|
| 2005/0137877 A1 | 6/2005 | Oesterling et al. | 704/275 |
| 2005/0143994 A1 | 6/2005 | Mori et al. | 704/235 |
| 2005/0144013 A1* | 6/2005 | Fujimoto | G10L 15/22 704/277 |
| 2005/0144187 A1 | 6/2005 | Che | |
| 2005/0149319 A1 | 7/2005 | Honda | |
| 2005/0169441 A1* | 8/2005 | Yacoub | H04M 3/4936 379/88.16 |
| 2005/0216254 A1 | 9/2005 | Gupta et al. | 704/9 |
| 2005/0222763 A1 | 10/2005 | Uyeki | |
| 2005/0234637 A1 | 10/2005 | Obradovich | |
| 2005/0234727 A1 | 10/2005 | Chiu | 704/270.1 |
| 2005/0246174 A1 | 11/2005 | DeGolia | 704/270 |
| 2005/0283364 A1* | 12/2005 | Longe | G06K 9/00422 704/257 |
| 2005/0283532 A1* | 12/2005 | Kim | H04L 12/2803 709/225 |
| 2005/0283752 A1 | 12/2005 | Fruchter et al. | 717/100 |
| 2006/0041431 A1 | 2/2006 | Maes | 704/270.1 |
| 2006/0046740 A1 | 3/2006 | Johnson | |
| 2006/0047509 A1 | 3/2006 | Ding et al. | 704/231 |
| 2006/0072738 A1 | 4/2006 | Louis et al. | 379/265.02 |
| 2006/0074670 A1* | 4/2006 | Weng | G10L 15/22 704/257 |
| 2006/0074671 A1* | 4/2006 | Farmaner | G10L 15/193 704/257 |
| 2006/0080098 A1* | 4/2006 | Campbell | G10L 13/027 704/243 |
| 2006/0100851 A1 | 5/2006 | Schonebeck | |
| 2006/0106769 A1* | 5/2006 | Gibbs | G06F 17/276 |
| 2006/0129409 A1* | 6/2006 | Mizutani | G06F 17/289 704/275 |
| 2006/0130002 A1 | 6/2006 | Hirayama | |
| 2006/0182085 A1 | 8/2006 | Sweeney | |
| 2006/0206310 A1 | 9/2006 | Ravikumar et al. | 704/9 |
| 2006/0217133 A1 | 9/2006 | Christenson et al. | 455/461 |
| 2006/0236343 A1* | 10/2006 | Chang | H04N 5/44543 725/61 |
| 2006/0242017 A1 | 10/2006 | Libes | |
| 2006/0253247 A1 | 11/2006 | de Silva | |
| 2006/0253281 A1 | 11/2006 | Letzt | |
| 2006/0285662 A1 | 12/2006 | Yin et al. | 379/88.16 |
| 2007/0011159 A1* | 1/2007 | Hillis | G06F 17/30353 |
| 2007/0033005 A1 | 2/2007 | Cristo et al. | 704/9 |
| 2007/0033020 A1 | 2/2007 | (Kelleher) Francois et al. | 704/226 |
| 2007/0033526 A1 | 2/2007 | Thompson | |
| 2007/0033436 A1 | 2/2007 | Cristo et al. | 704/9 |
| 2007/0038445 A1 | 2/2007 | Helbing et al. | 704/235 |
| 2007/0043569 A1 | 2/2007 | Potter, III et al. | 704/270 |
| 2007/0043574 A1 | 2/2007 | Coffman et al. | 704/275 |
| 2007/0043868 A1 | 2/2007 | Kumar et al. | 709/226 |
| 2007/0050191 A1 | 3/2007 | Weider et al. | 704/275 |
| 2007/0050279 A1 | 3/2007 | Huang | |
| 2007/0055525 A1 | 3/2007 | Kennewick et al. | 704/257 |
| 2007/0060114 A1 | 3/2007 | Ramer | |
| 2007/0061067 A1 | 3/2007 | Zeinstra et al. | 701/200 |
| 2007/0061735 A1 | 3/2007 | Hoffberg et al. | 715/744 |
| 2007/0067310 A1 | 3/2007 | Gupta | |
| 2007/0073544 A1 | 3/2007 | Millett et al. | 704/277 |
| 2007/0078708 A1 | 4/2007 | Yu et al. | 705/14 |
| 2007/0078709 A1 | 4/2007 | Rajaram | 705/14 |
| 2007/0078814 A1 | 4/2007 | Flowers | |
| 2007/0094003 A1 | 4/2007 | Huang et al. | 704/3 |
| 2007/0100797 A1* | 5/2007 | Thun | G06F 17/30994 |
| 2007/0106499 A1 | 5/2007 | Dahlgren | |
| 2007/0112555 A1 | 5/2007 | Lavi | |
| 2007/0112630 A1 | 5/2007 | Lau | |
| 2007/0118357 A1 | 5/2007 | Kasravi et al. | 704/10 |
| 2007/0124057 A1 | 5/2007 | Prieto | |
| 2007/0135101 A1 | 6/2007 | Ramati et al. | 455/414.1 |
| 2007/0146833 A1 | 6/2007 | Satomi et al. | 358/537 |
| 2007/0162296 A1 | 7/2007 | Altberg et al. | 705/1 |
| 2007/0174258 A1 | 7/2007 | Jones | |
| 2007/0179778 A1 | 8/2007 | Gong et al. | 704/9 |
| 2007/0185859 A1 | 8/2007 | Flowers | |
| 2007/0186165 A1 | 8/2007 | Maislos et al. | 715/728 |
| 2007/0192309 A1 | 8/2007 | Fischer | |
| 2007/0198267 A1 | 8/2007 | Jones et al. | 704/257 |
| 2007/0203699 A1 | 8/2007 | Nagashima | |
| 2007/0203736 A1 | 8/2007 | Ashton | 705/1 |
| 2007/0208732 A1 | 9/2007 | Flowers | |
| 2007/0214182 A1 | 9/2007 | Rosenberg | 707/104.1 |
| 2007/0250901 A1 | 10/2007 | McIntire et al. | 725/146 |
| 2007/0265850 A1 | 11/2007 | Kennewick et al. | 704/257 |
| 2007/0266257 A1 | 11/2007 | Camaisa | |
| 2007/0276651 A1 | 11/2007 | Bliss | |
| 2007/0294615 A1* | 12/2007 | Sathe | G06F 17/30702 707/803 |
| 2007/0299824 A1 | 12/2007 | Pan et al. | 707/3 |
| 2008/0014908 A1 | 1/2008 | Vasant | |
| 2008/0034032 A1 | 2/2008 | Healey et al. | 709/203 |
| 2008/0046311 A1 | 2/2008 | Shahine | |
| 2008/0059188 A1 | 3/2008 | Konopka | |
| 2008/0065386 A1 | 3/2008 | Cross et al. | 704/270 |
| 2008/0065389 A1 | 3/2008 | Cross | |
| 2008/0065390 A1* | 3/2008 | Ativanichayaphong | G06F 9/4446 704/270 |
| 2008/0086455 A1 | 4/2008 | Meisels | |
| 2008/0091406 A1 | 4/2008 | Baldwin et al. | 704/4 |
| 2008/0103761 A1 | 5/2008 | Printz et al. | 704/9 |
| 2008/0103781 A1 | 5/2008 | Wasson | |
| 2008/0104071 A1 | 5/2008 | Pragada | |
| 2008/0109285 A1 | 5/2008 | Reuther et al. | 705/7 |
| 2008/0115163 A1 | 5/2008 | Gilboa et al. | 725/34 |
| 2008/0126091 A1 | 5/2008 | Clark | |
| 2008/0126284 A1 | 5/2008 | Forbes | |
| 2008/0133215 A1 | 6/2008 | Sarukkai | 704/2 |
| 2008/0140385 A1 | 6/2008 | Mahajan et al. | 704/9 |
| 2008/0147396 A1 | 6/2008 | Wang | 704/246 |
| 2008/0147410 A1 | 6/2008 | Odinak | 704/270.1 |
| 2008/0147637 A1 | 6/2008 | Li | |
| 2008/0154604 A1 | 6/2008 | Sathish et al. | 704/257 |
| 2008/0162471 A1 | 7/2008 | Bernard | 707/5 |
| 2008/0177530 A1 | 7/2008 | Cross et al. | 704/4 |
| 2008/0184164 A1* | 7/2008 | Di Fabbrizio | G06F 3/167 715/809 |
| 2008/0189110 A1 | 8/2008 | Freeman et al. | 704/251 |
| 2008/0189187 A1 | 8/2008 | Hao | |
| 2008/0228496 A1 | 9/2008 | Yu | |
| 2008/0235023 A1 | 9/2008 | Kennewick et al. | 704/257 |
| 2008/0235027 A1 | 9/2008 | Cross | 704/270.1 |
| 2008/0269958 A1 | 10/2008 | Filev | |
| 2008/0270135 A1 | 10/2008 | Goel | |
| 2008/0270224 A1 | 10/2008 | Portman | |
| 2008/0294437 A1 | 11/2008 | Nakano | |
| 2008/0294994 A1 | 11/2008 | Kruger | |
| 2008/0306743 A1* | 12/2008 | Di Fabbrizio | G10L 15/22 704/275 |
| 2008/0319751 A1 | 12/2008 | Kennewick et al. | 704/257 |
| 2009/0006077 A1 | 1/2009 | Keaveney | |
| 2009/0006194 A1 | 1/2009 | Prashantidharan | |
| 2009/0018829 A1* | 1/2009 | Kuperstein | G10L 15/26 704/235 |
| 2009/0024476 A1 | 1/2009 | Baar | |
| 2009/0030686 A1 | 1/2009 | Weng | |
| 2009/0052635 A1 | 2/2009 | Jones et al. | 379/88.02 |
| 2009/0055176 A1 | 2/2009 | Hu | |
| 2009/0067599 A1 | 3/2009 | Agarwal et al. | 379/114.21 |
| 2009/0076827 A1 | 3/2009 | Bulitta et al. | 704/275 |
| 2009/0106029 A1 | 4/2009 | DeLine et al. | 704/275 |
| 2009/0117885 A1 | 5/2009 | Roth | 455/414.3 |
| 2009/0144131 A1 | 6/2009 | Chiu | |
| 2009/0144271 A1 | 6/2009 | Richardson et al. | 707/5 |
| 2009/0150156 A1 | 6/2009 | Kennewick et al. | 704/257 |
| 2009/0157382 A1 | 6/2009 | Bar | |
| 2009/0164216 A1 | 6/2009 | Chengalvarayan | |
| 2009/0171664 A1 | 7/2009 | Kennewick et al. | 704/257 |
| 2009/0171912 A1 | 7/2009 | Nash | |
| 2009/0197582 A1 | 8/2009 | Lewis | |
| 2009/0216540 A1 | 8/2009 | Tessel et al. | 704/275 |
| 2009/0248565 A1 | 10/2009 | Chuang | |

(56) References Cited

U.S. PATENT DOCUMENTS

| | | |
|---|---|---|
| 2009/0248605 A1 | 10/2009 | Mitchell |
| 2009/0259561 A1 | 10/2009 | Boys |
| 2009/0259646 A1 | 10/2009 | Fujita et al. ............ 707/5 |
| 2009/0265163 A1 | 10/2009 | Li |
| 2009/0271194 A1 | 10/2009 | Davis et al. ............ 704/235 |
| 2009/0273563 A1 | 11/2009 | Pryor ............ 345/157 |
| 2009/0276700 A1 | 11/2009 | Anderson et al. ............ 715/700 |
| 2009/0287680 A1 | 11/2009 | Paek |
| 2009/0299745 A1 | 12/2009 | Kennewick et al. ............ 704/257 |
| 2009/0299857 A1 | 12/2009 | Brubaker |
| 2009/0304161 A1 | 12/2009 | Pettyjohn |
| 2009/0307031 A1 | 12/2009 | Winkler et al. ............ 705/7 |
| 2009/0313026 A1 | 12/2009 | Coffman et al. ............ 704/275 |
| 2009/0319517 A1 | 12/2009 | Guha |
| 2010/0023320 A1 | 1/2010 | Di Cristo et al. ............ 704/9 |
| 2010/0023331 A1 | 1/2010 | Duta |
| 2010/0029261 A1 | 2/2010 | Mikkelsen et al. ............ 455/419 |
| 2010/0036967 A1 | 2/2010 | Caine et al. ............ 709/236 |
| 2010/0049501 A1 | 2/2010 | Kennewick et al. ............ 704/9 |
| 2010/0049514 A1 | 2/2010 | Kennewick et al. ............ 704/233 |
| 2010/0057443 A1 | 3/2010 | Di Cristo et al. ............ 704/9 |
| 2010/0063880 A1 | 3/2010 | Atsmon et al. ............ 705/14.53 |
| 2010/0064025 A1 | 3/2010 | Nelimarkka |
| 2010/0094707 A1 | 4/2010 | Freer ............ 705/14.54 |
| 2010/0138300 A1 | 6/2010 | Wallis |
| 2010/0145700 A1 | 6/2010 | Kennewick et al. ............ 704/257 |
| 2010/0185512 A1 | 7/2010 | Borger et al. ............ 705/14.49 |
| 2010/0191856 A1 | 7/2010 | Gupta |
| 2010/0204986 A1 | 8/2010 | Kennewick et al. ............ 704/226 |
| 2010/0204994 A1 | 8/2010 | Kennewick et al. ............ 704/257 |
| 2010/0217604 A1 | 8/2010 | Baldwin et al. ............ 704/275 |
| 2010/0268536 A1 | 10/2010 | Suendermann |
| 2010/0286985 A1 | 11/2010 | Kennewick et al. ............ 704/257 |
| 2010/0299142 A1 | 11/2010 | Freeman et al. ............ 704/9 |
| 2010/0312547 A1 | 12/2010 | Van Os |
| 2010/0312566 A1 | 12/2010 | Odinak et al. ............ 704/275 |
| 2010/0318357 A1 | 12/2010 | Istvan |
| 2010/0331064 A1 | 12/2010 | Michelstein |
| 2011/0022393 A1 | 1/2011 | Waller et al. ............ 704/270 |
| 2011/0106527 A1 | 5/2011 | Chiu |
| 2011/0112827 A1 | 5/2011 | Kennewick et al. ............ 704/9 |
| 2011/0112921 A1 | 5/2011 | Kennewick et al. ............ 705/26.1 |
| 2011/0119049 A1 | 5/2011 | Ylonen |
| 2011/0131036 A1 | 6/2011 | Di Cristo et al. ............ 704/9 |
| 2011/0131045 A1 | 6/2011 | Cristo et al. ............ 704/249 |
| 2011/0231182 A1 | 9/2011 | Weider et al. ............ 704/9 |
| 2011/0231188 A1 | 9/2011 | Kennewick et al. ............ 704/236 |
| 2011/0238409 A1* | 9/2011 | Larcheveque ...... G06F 17/2785 704/9 |
| 2011/0307167 A1 | 12/2011 | Taschereau |
| 2012/0022857 A1 | 1/2012 | Baldwin et al. ............ 704/9 |
| 2012/0041753 A1 | 2/2012 | Dymetman |
| 2012/0046935 A1 | 2/2012 | Nagao |
| 2012/0101809 A1 | 4/2012 | Kennewick et al. ............ 704/9 |
| 2012/0101810 A1 | 4/2012 | Kennewick et al. ............ 704/9 |
| 2012/0109753 A1 | 5/2012 | Kennewick et al. ............ 705/14.58 |
| 2012/0150620 A1 | 6/2012 | Mandyam |
| 2012/0150636 A1 | 6/2012 | Freeman et al. ............ 705/14.49 |
| 2012/0239498 A1 | 9/2012 | Ramer |
| 2012/0240060 A1 | 9/2012 | Pennington |
| 2012/0265528 A1 | 10/2012 | Gruber |
| 2012/0278073 A1 | 11/2012 | Weider et al. ............ 704/235 |
| 2013/0006734 A1 | 1/2013 | Ocko |
| 2013/0054228 A1 | 2/2013 | Baldwin et al. ............ 704/9 |
| 2013/0060625 A1 | 3/2013 | Davis |
| 2013/0080177 A1 | 3/2013 | Chen ............ 704/275 |
| 2013/0211710 A1 | 8/2013 | Kennewick et al. ............ 701/419 |
| 2013/0253929 A1 | 9/2013 | Weider et al. ............ 704/235 |
| 2013/0254314 A1 | 9/2013 | Chow |
| 2013/0297293 A1 | 11/2013 | Di Cristo et al. ............ 704/9 |
| 2013/0304473 A1 | 11/2013 | Baldwin et al. ............ 704/257 |
| 2013/0311324 A1 | 11/2013 | Stoll |
| 2013/0332454 A1 | 12/2013 | Stuhec |
| 2013/0339022 A1 | 12/2013 | Baldwin et al. ............ 704/257 |
| 2014/0006951 A1 | 1/2014 | Hunter |
| 2014/0012577 A1 | 1/2014 | Freeman et al. ............ 704/249 |
| 2014/0025371 A1 | 1/2014 | Min |
| 2014/0108013 A1 | 4/2014 | Di Cristo et al. ............ 704/254 |
| 2014/0136187 A1 | 5/2014 | Wolverton |
| 2014/0156278 A1 | 6/2014 | Kennewick et al. ............ 704/254 |
| 2014/0195238 A1 | 7/2014 | Terao |
| 2014/0236575 A1 | 8/2014 | Tur |
| 2014/0249821 A1 | 9/2014 | Kennewick et al. ............ 704/257 |
| 2014/0249822 A1 | 9/2014 | Baldwin et al. ............ 704/257 |
| 2014/0278413 A1 | 9/2014 | Pitschel |
| 2014/0278416 A1 | 9/2014 | Schuster |
| 2014/0288934 A1 | 9/2014 | Kennewick et al. ............ 704/254 |
| 2014/0330552 A1 | 11/2014 | Bangalore |
| 2014/0337007 A1 | 11/2014 | Waibel |
| 2014/0365222 A1 | 12/2014 | Weider et al. ............ 704/257 |
| 2015/0019211 A1 | 1/2015 | Simard |
| 2015/0019217 A1 | 1/2015 | Di Cristo et al. ............ 704/235 |
| 2015/0019227 A1 | 1/2015 | Anandarajah |
| 2015/0066479 A1 | 3/2015 | Pasupalak |
| 2015/0066627 A1 | 3/2015 | Freeman et al. ............ 705/14.41 |
| 2015/0073910 A1 | 3/2015 | Kennewick et al. ............ 705/14.58 |
| 2015/0095159 A1 | 4/2015 | Kennewick et al. ............ 705/14.58 |
| 2015/0142447 A1 | 5/2015 | Kennewick |
| 2015/0170641 A1 | 6/2015 | Kennewick |
| 2015/0193379 A1 | 7/2015 | Mehta |
| 2015/0199339 A1 | 7/2015 | Mirkin |
| 2015/0293917 A1 | 10/2015 | Bufe |
| 2015/0348544 A1 | 12/2015 | Baldwin |
| 2015/0348551 A1 | 12/2015 | Gruber |
| 2015/0364133 A1 | 12/2015 | Freeman |
| 2016/0049152 A1 | 2/2016 | Kennewick |
| 2016/0078482 A1 | 3/2016 | Kennewick |
| 2016/0078491 A1 | 3/2016 | Kennewick |
| 2016/0078504 A1 | 3/2016 | Kennewick |
| 2016/0078773 A1 | 3/2016 | Carter |
| 2016/0110347 A1 | 4/2016 | Kennewick |
| 2016/0148610 A1 | 5/2016 | Kennewick |
| 2016/0148612 A1 | 5/2016 | Guo |
| 2016/0188292 A1 | 6/2016 | Carter |
| 2016/0188573 A1 | 6/2016 | Tang |
| 2016/0217785 A1 | 7/2016 | Kennewick |
| 2016/0335676 A1 | 11/2016 | Freeman |

FOREIGN PATENT DOCUMENTS

| | | |
|---|---|---|
| EP | 1 320 043 A2 | 6/2003 |
| EP | 1 646 037 | 4/2006 |
| JP | H08263258 | 10/1996 |
| JP | H11249773 | 9/1999 |
| JP | 2001071289 | 3/2001 |
| JP | 2006-146881 | 6/2006 |
| JP | 2008-027454 | 2/2008 |
| JP | 2008058465 | 3/2008 |
| JP | 2008-139928 | 6/2008 |
| JP | 2011504304 | 2/2011 |
| JP | 2012518847 | 8/2012 |
| WO | WO 99/46763 | 9/1999 |
| WO | WO 00/21232 | 4/2000 |
| WO | WO 00/46792 | 8/2000 |
| WO | 0129742 | 4/2001 |
| WO | 0171609 A2 | 9/2001 |
| WO | WO 01/78065 | 10/2001 |
| WO | WO 2004/072954 | 8/2004 |
| WO | 2005010702 A2 | 2/2005 |
| WO | WO 2007/019318 | 2/2007 |
| WO | WO 2007/021587 | 2/2007 |
| WO | WO 2007/027546 | 3/2007 |
| WO | WO 2007/027989 | 3/2007 |
| WO | WO 2008/098039 | 8/2008 |
| WO | WO 2008/118195 | 10/2008 |
| WO | WO 2009/075912 | 6/2009 |
| WO | 2009111721 | 9/2009 |
| WO | WO 2009/145796 | 12/2009 |
| WO | WO 2010/096752 | 8/2010 |
| WO | 2016044290 | 3/2016 |
| WO | 2016044316 | 3/2016 |
| WO | 2016044319 | 3/2016 |

(56) References Cited

FOREIGN PATENT DOCUMENTS

| WO | 2016044321 | 3/2016 |
|---|---|---|
| WO | 2016061309 | 4/2016 |

OTHER PUBLICATIONS

Wu, Su-Lin, et al., "Incorporating Information from Syllable-Length Time Scales into Automatic Speech Recognition", Proceedings of the 1998 IEEE International Conference on Acoustics, Speech and Signal Processing, 1998, vol. 2, IEEE, 1998, 4 pages.
Wu, Su-Lin, et al., "Integrating Syllable Boundary Information into Speech Recognition", IEEE International Conference on Acoustics, Speech, and Signal Processing, ICASSP-97, 1997, vol. 2, IEEE, 1997, 4 pages.
Reuters, "IBM to Enable Honda Drivers to Talk to Cars", Charles Schwab & Co., Inc., Jul. 28, 2002, 1 page.
Lin, Bor-shen, et al., "A Distributed Architecture for Cooperative Spoken Dialogue Agents with Coherent Dialogue State and History", ASRU'99, 1999, 4 pages.
Kuhn, Thomas, et al., "Hybrid In-Car Speech Recognition for Mobile Multimedia Applications", Vehicular Technology Conference, IEEE, Jul. 1999, pp. 2009-2013.
Belvin, Robert, et al., "Development of the HRL Route Navigation Dialogue System", Proceedings of the First International Conference on Human Language Technology Research, San Diego, 2001, pp. 1-5.
Lind, R., et al., "The Network Vehicle—A Glimpse into the Future of Mobile Multi-Media" *IEEE Aerosp. Electron. Systems Magazine*, vol. 14, No. 9, Sep. 1999, pp. 27-32.
Zhao, Yilin, "Telematics: Safe and Fun Driving", *IEEE Intelligent Systems*, vol. 17, Issue 1, 2002, pp. 10-14.
Chai et al., "MIND: A Semantics-Based Multimodal Interpretation Framework for Conversational System", *Proceedings of the International CLASS Workshop on Natural, Intelligent and Effective Interaction in Multimodal Dialogue Systems*, Jun. 2002, pp. 37-46.
Cheyer et al., "Multimodal Maps: An Agent-Based Approach", *International Conference on Cooperative Multimodal Communication* (CMC/95), May 24-26, 1995, pp. 111-121.
Elio et al., "On Abstract Task Models and Conversation Policies" in Workshop on Specifying and Implementing Conversation Policies, *Autonomous Agents '99*, Seattle, 1999, 10 pages.
Turunen, "Adaptive Interaction Methods in Speech User Interfaces", Conference on Human Factors in Computing Systems, Seattle, Washington, 2001, pp. 91-92.
Mao, Mark Z., "Automatic Training Set Segmentation for Multi-Pass Speech Recognition", Department of Electrical Engineering, Stanford University, CA, copyright 2005, IEEE, pp. I-685 to I-688.
Vanhoucke, Vincent, "Confidence Scoring and Rejection Using Multi-Pass Speech Recognition", Nuance Communications, Menlo Park, CA, 2005, 4 pages.
Weng, Fuliang, et al., "Efficient Lattice Representation and Generation", Speech Technology and Research Laboratory, SRI International, Menlo Park, CA, 1998, 4 pages.
El Meliani et al., "A Syllabic-Filler-Based Continuous Speech Recognizer for Unlimited Vocabulary", Canadian Conference on Electrical and Computer Engineering, vol. 2, Sep. 5-8, 1995, pp. 1007-1010.
Arrington, Michael, "Google Redefines GPS Navigation Landscape: Google Maps Navigation for Android 2.0", TechCrunch, printed from the Internet <http://www.techcrunch.com/2009/10/28/google-redefines-car-gps-navigation-google-maps-navigation-android/>, Oct. 28, 2009, 4 pages.
Bazzi, Issam et al., "Heterogeneous Lexical Units for Automatic Speech Recognition: Preliminary Investigations", *Processing of the IEEE International Conference on Acoustics, Speech, and Signal Processing*, vol. 3, Jun. 5-9, 2000, XP010507574, pp. 1257-1260.
O'Shaughnessy, Douglas, "Interacting with Computers by Voice: Automatic Speech Recognition and Synthesis", *Proceedings of the IEEE*, vol. 91, No. 9, Sep. 1, 2003, XP011100665, pp. 1272-1305.
Statement in Accordance with the Notice from the European Patent Office dated Oct. 1, 2007 Concerning Business Methods (OJ EPO Nov. 2007, 592-593), XP002456252.
Davis, Z., et al., A Personal Handheld Multi-Modal Shopping Assistant, IEEE, 2006, 9 pages.

* cited by examiner

SYSTEM AND METHOD FOR A COOPERATIVE CONVERSATIONAL VOICE USER INTERFACE

CROSS-REFERENCE TO RELATED APPLICATIONS

This application is a continuation of U.S. patent application Ser. No. 13/987,645, entitled "System and Method for a Cooperative Conversational Voice User Interface," filed Aug. 19, 2013, which is a divisional of U.S. patent application Ser. No. 13/251,712, entitled "System and Method for a Cooperative Conversational Voice User Interface," filed Oct. 3, 2011 (which issued as U.S. Pat. No. 8,515,765 on Aug. 20, 2013), which is a continuation of U.S. patent application Ser. No. 11/580,926, entitled "System and Method for a Cooperative Conversational Voice User Interface," filed Oct. 16, 2006 (which issued as U.S. Pat. No. 8,073,681 on Dec. 6, 2011), each of which are hereby incorporated by reference in its entirety.

FIELD OF THE INVENTION

The invention relates to a cooperative conversational model for a human to machine voice user interface.

BACKGROUND OF THE INVENTION

Advances in technology, particularly within the convergence space, have resulted in an increase in demand for voice recognition software that can exploit technology in ways that are intuitive to humans. While communication between human beings is most often "cooperative," in that information and/or context is shared to advance mutual conversational goals, existing Human-to-Machine interfaces fail to provide the same level of intuitive interaction. For example, each human participant in a conversation can contribute to an exchange for the benefit of the exchange. This is done through shared assumptions and expectations regarding various aspects of the conversation, such as the topic, participant knowledge about the topic, expectations of the other participant's knowledge about the topic, appropriate word usage for the topic and/or participants, conversational development based on previous utterances, the participants' tone or inflection, the quality and quantity of contribution expected from each participant, and many other factors. Participating in conversations that continually build and draw upon shared information is a natural and intuitive way for humans to converse.

In contrast, complex Human-to-Machine interfaces do not allow users to exploit technology in an intuitive way, which inhibits mass-market adoption for various technologies. Incorporating a speech interface helps to alleviate this burden by making interaction easier and faster, but existing speech interfaces (when they actually work) still require significant learning on the part of the user. That is, existing speech interfaces are unable to bridge the gap between archaic Human-to-Machine interfaces and conversational speech that would make interaction with systems feel normal. Users should be able to directly request what they want from a system in a normal, conversational fashion, without having to memorize exact words or phrases. Alternatively, when users are uncertain of particular needs, they should be able to engage the system in a productive, cooperative dialogue to resolve their requests. Instead, existing speech interfaces force users to dumb down their requests to match simple sets of instructions in simple languages in order to communicate requests in ways that systems can understand. Using existing speech interfaces, there is virtually no option for dialogue between the user and the system to satisfy mutual goals.

Therefore, existing systems lack a conversational speech model that can provide users with the ability to interact with systems in ways that are inherently intuitive to human beings. Existing systems suffer from these and other problems.

SUMMARY OF THE INVENTION

According to various embodiments and aspects of the invention, a cooperative conversational voice user interface may understand free form human utterances, freeing users from being restricted to a fixed set of commands and/or requests. Rather, users can engage in cooperative conversations with a machine to complete a request or series of requests using a natural, intuitive, free form manner of expression.

According to an aspect of the invention, an exemplary system architecture for implementing a cooperative conversational voice user interface is provided. The system may receive an input, which may include a human utterance received by an input device, where the utterance may include one or more requests. As used herein, an "utterance" may be words, syllables, phonemes, or any other audible sound made by a human being. As used herein, a "request" may be a command, directive, or other instruction for a device, computer, or other machine to retrieve information, perform a task, or take some other action. In one implementation, the input may be a multi-modal input, where at least part of the multi-modal input is an utterance. The utterance component of the input may be processed by a speech recognition engine (which may alternatively be referred to as an Automatic Speech Recognizer or ASR) to generate one or more preliminary interpretations of the utterance. The one or more preliminary interpretations may then be provided to a conversational speech engine for further processing, where the conversational speech engine may communicate with one or more databases to generate an adaptive conversational response, which may be returned to the user as an output. In one implementation, the output may be a multi-modal output. For example, the utterance may include a request to perform an action, and the output may include a conversational response reporting success or failure, as well as an execution of the action.

According to another aspect of the invention, an exemplary conversational speech engine may generate an adaptive conversational response to a request or series of requests. The conversational speech engine may include a free form voice search module that may understand an utterance made using typical, day-to-day language (i.e., in free form), and may account for variations in how humans normally speak, the vocabulary they use, and the conditions in which they speak. To account for intangible variables of human speech, the free form search module may include models of casual human speech. For example, in one implementation, the free form search module may understand specialized jargon and/or slang, tolerate variations in word order, and tolerate verbalized pauses or stuttered speech. For example, formalized English requests, where a verb precedes a noun, may be treated in an equivalent manner to requests where the noun precedes the verb. In another implementation, compound requests and/or compound tasks with multiple variables may be identified in a single utterance. By identifying all relevant information for completing one or more tasks from a single utterance, advantages may be provided over existing voice user interfaces, such as Command and Control systems that use verbal menus to restrict information that a person can provide at a given point. In another implementation, inferring intended requests from incomplete or ambiguous requests may provide a conversational feel. By modeling what contextual signifiers, qualifiers, or other information may be required to perform a task in an identified context, an adaptive response may be generated, such as prompting a user for missing contextual signifiers, qualifiers, or other information. In one implementation, the response may ask for missing information in a way that most restricts possible interpretations, and the response may be framed to establish a domain for a subsequent user utterance. In another implementation, common alternatives for nouns and verbs may be recognized to reflect variations in usage patterns according to various criteria. Thus, variations in expression may be supported because word order is unimportant or unanticipated, and nouns and/or verbs may be represented in different ways to give simplistic, yet representative, examples. In another implementation, requests may be inferred from contradictory or otherwise inaccurate information, such as when an utterance includes starts and stops, restarts, stutters, run-on sentences, or other imperfect speech. For example, a user may sometimes change their mind, and thus alter the request in mid-utterance, and the imperfect speech feature may nonetheless be able to infer a request based on models of human speech. For example, various models may indicate that a last criterion is most likely to be correct, or intonation, emphasis, stress, use of the word "not," or other models may indicate which criterion is most likely to be correct.

According to another aspect of the invention, the conversational speech engine may include a noise tolerance module that may discard words or noise which has no meaning in a given context to reduce a likelihood of confusion. Moreover, the noise tolerance module may filter out environmental and non-human noise to further reduce a likelihood of confusion. In one implementation, the noise tolerance module may cooperate with other modules and features to filter out words that do not fit into an identified context. For example, the noise tolerance module may filter other human conversations and/or utterances within a range of one or more microphones. For example, a single device may include multiple microphones, or multiple devices may each include one or more microphones, and the noise tolerance module may collate inputs and cooperatively filter out sound by comparing a speech signal from the various microphones. The noise tolerance module may also filter out non-human environmental noise within range of the microphones, out-of-vocabulary words caused by speaker ambiguity or malapropisms, or other noise that may be unrelated to a target request. Performance benchmarks for the noise tolerance module may be defined by noise models based on human criteria. For example, if a driver of a car is 92% likely to be understood by a passenger when traveling at 65 miles-per-hour with windows cracked, then performance benchmarks for the noise tolerance module may have a similar performance under such conditions.

According to another aspect of the invention, the conversational speech engine may include a context determination process that determines one or more contexts for a request to establish meaning within a conversation. The one or more contexts may be determined by having one or more context domain agents compete to determine a most appropriate domain for a given utterance. Once a given domain agent "wins" the competition, the winning domain agent may be responsible for establishing or inferring further contexts and updating short-term and long-term shared knowledge. If there is a deadlock between context domain agents, an adaptive conversational response may prompt the user to assist in disambiguating between the deadlocked agents. Moreover, the context determination process may infer intended operations and/or context based on previous utterances and/or requests, whereas existing systems consider each utterance independently, potentially making the same errors over and over again. For example, if a given interpretation turns out to be incorrect, the incorrect interpretation may be removed as a potential interpretation from one or more grammars associated with the speech recognition engine and/or from possible interpretations determined by the conversational speech engine, thereby assuring that a mistake will not be repeated for an identical utterance.

The context determination process may provide advantages over existing voice user interfaces by continually updating one or more models of an existing context and establishing context as a by-product of a conversation, which cannot be established a priori. Rather, the context determination process may track conversation topics and attempt to fit a current utterance into recent contexts, including switching between contexts as tasks are completed, partially completed, requested, etc. The context determination process may identify one or more context domains for an utterance by defining a collection of related functions that may be useful for users in various context domains. Moreover, each context domain may have relevant vocabularies and thought collections to model word groupings, which when evaluated together, may disambiguate one context domain from another. Thus, eliminating out-of-context words and noise words when searching for relevant combinations may enhance accuracy of inferences. This provides advantages over existing systems that attempt to assign meaning to every component of an utterance (i.e., including out-of-context words and noise words), which results in nearly infinite possible combinations and greater likelihood of confusion. The context determination process may also be self-aware, assigning degrees of certainty to one or more generated hypotheses, where a hypothesis may be developed to account for variations in environmental conditions, speaker ambiguity, accents, or other factors. By identifying a context, capabilities within the context, vocabularies within the context, what tasks are done most often historically in the context, what task was just completed, etc., the context determination process may establish intent from rather meager phonetic clues. Moreover, just as in human-to-human conversation, users may switch contexts at any time without confusion, enabling various context domains to be rapidly selected, without menu-driven dead ends, when an utterance is unambiguous.

According to another aspect of the invention, an exemplary cooperative conversational model may build upon free form voice search, noise tolerance, and context determination to implement a conversational Human-to-Machine interface that reflects human interaction and normal conversational behavior. That is, the cooperative conversational model enables humans and machines to participant in a conversation with an accepted purpose or direction, with each participant contributing to the conversation for the benefit of the conversation. By taking advantage of human presumptions about utterances that humans rely upon, both as speakers and listeners, a Human-to-Machine interface may be analogous to everyday human-to-human conversation. In one implementation, the exemplary cooperative conversation model may take incoming data (shared knowledge) to inform a decision (intelligent hypothesis building), and then may refine the decision and generate a response (adaptive response building).

According to another aspect of the invention, shared knowledge may include both short-term and long-term knowledge. Short-term knowledge may accumulate during a single conversation, where input received during a single conversation may be retained. The shared knowledge may include cross-modality awareness, where in addition to accumulating input relating to user utterances, requests, locations, etc., the shared knowledge may accumulate a current user interface state relating to other modal inputs to further build shared knowledge models. The shared knowledge may be used to build one or more intelligent hypotheses using current and relevant information, build long-term shared knowledge by identifying information with long-term significance, and generate adaptive responses with relevant state and word usage information. Moreover, because cooperative conversations model human conversations, short-term session data may be expired after a psychologically appropriate amount of time, thereby humanizing system behavior, reducing a likelihood of contextual confusion based on stale data, while also adding relevant information from an expired session context to long-term knowledge models. Long-term shared knowledge may generally be user-centric, rather than session-based, where inputs may be accumulated over time to build user, environmental, cognitive, historical, or other long-term knowledge models. Long-term and short-term shared knowledge may be used simultaneously anytime a user engages in a cooperative conversation. Long-term shared knowledge may include explicit and/or implicit user preferences, a history of recent contexts, requests, tasks, etc., user-specific jargon related to vocabularies and/or capabilities of a context, most often used word choices, or other information. The long-term shared knowledge may be used to build one or more intelligent hypotheses using current and relevant information, generate adaptive responses with appropriate word choices when unavailable via short-term shared knowledge, refine long-term shared knowledge models, identify a frequency of specific tasks, identify tasks a user frequently has difficulty with, or provide other information and/or analysis to generate more accurate conversational responses. Shared knowledge may also be used to adapt a level of unprompted support (e.g., for novices versus experienced users, users who are frequently misrecognized, etc.) Thus, shared knowledge may enable a user and a voice user interface to share assumptions and expectations such as topic knowledge, conversation history, word usage, jargon, tone, or other assumptions and/or expectations that facilitate a cooperative conversation between human users and a system.

According to another aspect of the invention, a conversation type may be identified for any given utterance. Categorizing and developing conceptual models for various types of exchanges may consistently align user expectations and domain capabilities. One or more intelligent hypotheses may be generated as to a conversation type by considering conversational goals, participant roles, and/or an allocation of information among the participants. Based on the conversational goals, participant roles, and allocation of information, the intelligent hypotheses may consider various factors to classify a conversation (or utterance) into general types of conversations that can interact with one another to form many more variations and permutations of conversation types (e.g., a conversation type may change dynamically as information is reallocated from one participant to another, or as conversational goals change based on the reallocation of information).

According to another aspect of the invention, the intelligent hypotheses may include one or more hypotheses of a user's intent in an utterance. In addition, the intelligent hypotheses may use short-term and/or long-term shared knowledge to proactively build and evaluate interaction with a user as a conversation progresses or over time. The hypotheses may model human-to-human interaction to include a varying degree of certainty for each hypothesis. That is, just as humans rely on knowledge shared by participants to examine how much and what kind of information was available, the intelligent hypotheses may leverage the identified conversation type and shared knowledge to generate a degree of certainty for each hypothesis.

According to another aspect of the invention, syntactically, grammatically, and contextually sensitive "intelligent responses" may be generated from the intelligent hypotheses that can be used to generate a conversational experience for a user, while also guiding the user to reply in a manner favorable for recognition. The intelligent responses may create a conversational feel by adapting to a user's manner of speaking, framing responses appropriately, and having natural variation and/or personality (e.g., by varying tone, pace, timing, inflection, word use, jargon, and other variables in a verbal or audible response).

According to another aspect of the invention, the intelligent responses may adapt to a user's manner of speaking by using contextual signifiers and grammatical rules to generate one or more sentences that may cooperate with the user. By taking advantage of shared knowledge about how a user utters a request, the responses may be modeled using similar techniques used to recognize requests. The intelligent responses may rate possible responses statistically and/or randomize responses, which creates an opportunity to build an exchange with natural variation and conversational feel. This provides advantages over existing voice user interfaces where input and output is incongruous, as the input is "conversational" and the output is "computerese."

According to another aspect of the invention, the intelligent responses may frame responses to influence a user reply utterance for easy recognition. For example, the responses may be modeled to illicit utterances from the user that may be more likely to result in a completed request. Thus, the responses may conform to a cooperative nature of human dialog and a natural human tendency to "parrot" what was just heard as part of a next utterance. Moreover, knowledge of current context may enhance responses to generate more meaningful conversational responses. Framing the responses may also deal with misrecognitions according to human models. For example, humans frequently remember a number of recent utterances, especially when one or more previous utterances were misrecognized or unrecognized. Another participant in the conversation may limit correction to a part of the utterance that was misrecognized or unrecognized, or over subsequent utterances and/or other interactions, clues may be provided to indicate the initial interpretation was incorrect. Thus, by storing and analyzing multiple utterances, utterances from earlier in a conversation may be corrected as the conversation progresses.

According to another aspect of the invention, the intelligent responses may include multi-modal, or cross-modal, responses to a user. In one implementation, responses may be aware of and control one or more devices and/or interfaces, and users may respond by using whichever input method, or combination of input methods, is most convenient.

According to another aspect of the invention, the intelligent responses may correct a course of a conversation without interrupting conversational flow. That is, even though the intelligent responses may be reasonably "sure," the intelligent responses may nonetheless sometimes be incorrect. While existing voice user interfaces tend to fail on average conversational missteps, normal human interactions may expect missteps and deal with them appropriately. Thus, responses after misrecognitions may be modeled after clarifications, rather than errors, and words may chosen in subsequent responses to move conversation forward and establish an appropriate domain to be explored with the user.

Other objects and advantages of the invention will be apparent to those skilled in the art based on the following drawings and detailed description.

DETAILED DESCRIPTION

Figure 1:
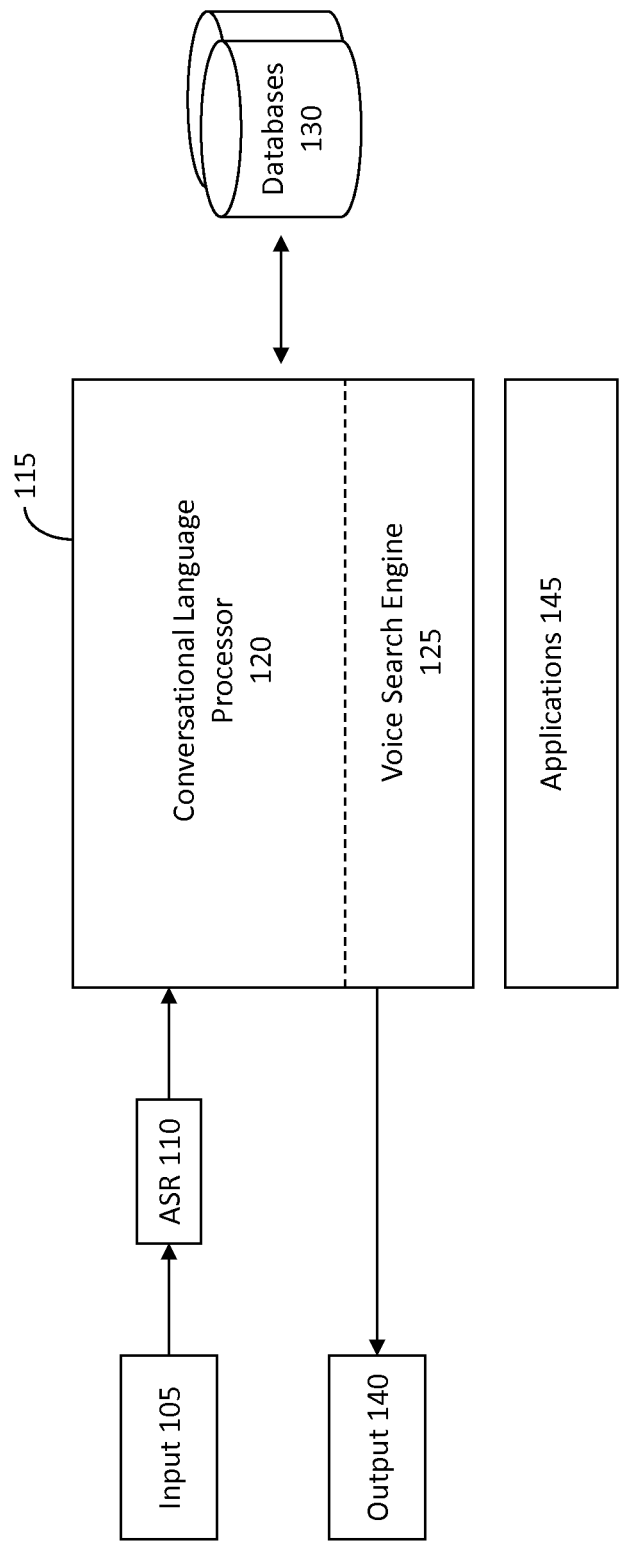
FIG. 1 is an exemplary block diagram of a system architecture according to one aspect of the invention.

Referring to FIG. 1, an exemplary system architecture for implementing a cooperative conversational voice user interface is illustrated according to one aspect of the invention. The system may receive an input 105 from a user, where in one implementation, input 105 may be an utterance received by an input device (e.g., a microphone), where the utterance may include one or more requests. Input 105 may also be a multi-modal input, where at least part of the multi-modal input is an utterance. For example, the input device may include a combination of a microphone and a touch-screen device, and input 105 may include an utterance that includes a request relating to a portion of a display on the touch-screen device that the user is touching. For instance, the touch-screen device may be a navigation device, and input 105 may include an utterance of "Give me directions to here," where the user may be requesting directions to a desired destination on the display of the navigation device.

The utterance component of input 105 may be processed by a speech recognition engine 110 (which may alternatively be referred to herein as Automatic Speech Recognizer 110, or as shown in FIG. 1, ASR 110) to generate one or more preliminary interpretations of the utterance. The speech recognition engine 110 may process the utterance using any suitable technique known in the art. For example, in one implementation, the speech recognition engine 110 may interpret the utterance using techniques of phonetic dictation to recognize a phoneme stream, as described in U.S. patent application Ser. No. 11/513,269, entitled "Dynamic Speech Sharpening," filed Aug. 31, 2006, which issued as U.S. Pat. No. 7,634,409 on Dec. 15, 2009, and which is hereby incorporated by reference in its entirety. The one or more preliminary interpretations generated by the speech recognition engine 110 may then be provided to a conversational speech engine 115 for further processing. Conversational speech engine 115 may include a conversational language processor 120 and/or a voice search engine 125, described in greater detail in FIG. 2 below. Conversational speech engine 115 may communicate with one or more databases 130 to generate an adaptive conversational response, which may be returned to the user as an output 140. In one implementation, output 140 may be a multi-modal output and/or an interaction with one or more applications 145 to complete the request. For example, output 140 may include a combination of an audible response and a display of a route on a navigation device. For example, the utterance may include a request to perform an action, and output 140 may include a conversational response reporting success or failure, as well as an execution of the action. In addition, in various implementations, the speech recognition engine 110, conversational speech engine 115, and/or databases 130 may reside locally (e.g., on a user device), remotely (e.g., on a server), or a hybrid model of local and remote processing may be used (e.g., lightweight applications may be processed locally while computationally intensive applications may be processed remotely).

Figure 2:
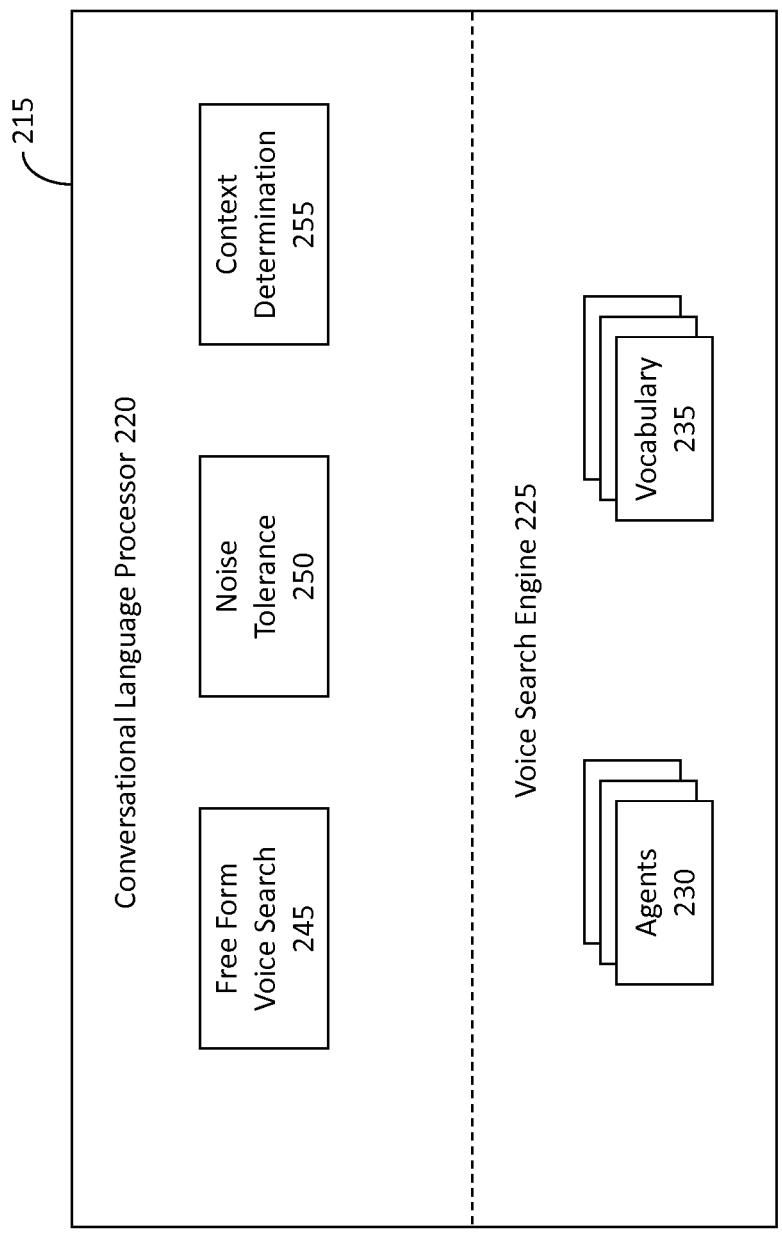
FIG. 2 is an exemplary block diagram of a conversational speech engine according to one aspect of the invention.

Referring to FIG. 2, an exemplary block diagram is provided illustrating a conversational speech engine 215 according to one aspect of the invention. Conversational speech engine 215 may include a conversational language processor 220 that generates an adaptive conversational response to a request or series of requests using a free form voice search module 245, a noise tolerance module 250, and/or a context determination process 255. According to one aspect of the invention, modules 245-255 may communicate with a voice search engine 225 that includes one or more context domain agents 230 and/or one or more vocabularies 235 to aid in interpreting utterances and generating responses, as described in "Enhancing the VUE™ (Voice-User-Experience) Through Conversational Speech," by Tom Freeman and Larry Baldwin, which is herein incorporated by reference in its entirety. Conversational speech engine 215 may generate an adaptive conversational response to one or more requests, where the requests may depend on unspoken assumptions, incomplete information, context established by previous utterances, user profiles, historical profiles, environmental profiles, or other information. Moreover, conversational speech engine 215 may track which requests have been completed, which requests are being processed, and/or which requests cannot be processed due to incomplete or inaccurate information, and the response may be generated accordingly.

According to one aspect of the invention, free form voice search module 245 may understand an utterance made using typical, day-to-day language (i.e., in free form), and may account for variations in how humans normally speak, the vocabulary they use, and the conditions in which they speak. Because variables such as stress, distraction, and serendipity are always different and infinitely varied, free form search module 245 may be designed with a goal of understanding that no human will come to the same Human-to-Machine interface situation in the same way twice. Thus, free form search module 245 may implement one or more features that model casual human speech. In various implementations, free form search module 245 may include, among other things, a free form utterance feature, a one-step access feature, an inferencing intended operations feature, an alternative expression feature, and/or an imperfect speech feature.

The free form utterance feature may understand specialized jargon and/or slang, tolerate variations in word order (e.g., whether a subject of a request comes before or after a verb may be irrelevant), and tolerate verbalized pauses (e.g., "um," "ah," "eh," and other utterances without meaning).

For example, the free form utterance feature may treat formalized English verb-before-noun requests in an equivalent manner to free form requests where a noun may precede a verb. For example, user utterances of "Change it to the Squizz" and "You know, um, that Squizz channel, ah, switch it there" may be treated equivalently (where Squizz is a channel on XM Satellite Radio). In either case, the free form utterance feature is able to identify "Squizz" as a subject of the utterance and "Change it" or "switch it" as a verb or request for the utterance (e.g., by cooperating with context determination process 255, or other features, and identifying a relevant context domain agent 230 and/or vocabulary 235 to interpret the utterance).

The one-step access feature may understand utterances that include compound requests with multiple variables. For example, a user utterance may be "What is the forecast for Boston this weekend?" The one-step access feature may identify "weather" as a context (e.g., by cooperating with context determination process 255, or other features, and identifying "forecast" as a synonym of "weather"), and search for a city equal to "Boston" and a time equal to "weekend." By identifying all relevant information for completing a task from a single utterance, the one-step access feature may overcome drawbacks of existing voice user interfaces, such as Command and Control systems that use verbal menus to restrict information that a person can provide at a given point (e.g., a Command and Control system for a phone directory service may say: "State please," . . . "City please," . . . "What listing," etc.). Moreover, some utterances may include compound requests, and the one-step access feature may decompose the compound requests into sub-tasks. For example, a user utterance of "I need to be at a meeting tomorrow in San Francisco at 8:00 am" may be decomposed into a set of sub-tasks such as (1) checking availability and reserving a flight on an evening before the meeting, (2) checking availability and reserving a hotel, (3) checking availability and reserving a car, etc., where users may further designate preferences for various tasks (e.g., first check availability on an airline for which the user is a frequent flyer). Depending on a level of shared knowledge about a user's preferences and/or historical patterns, the one-step access feature may infer additional tasks from a request. For example, in the above example, the one-step access feature may also check a weather forecast, and if the weather is "nice" (as defined by the user preferences and/or as inferred from historical patterns), the one-step access feature may schedule a tee-time at a preferred golf course in San Francisco.

The inferencing intended operations feature may identify an intended request from incomplete or ambiguous requests. For example, when a user utters "Route <indecipherable> Chicago <indecipherable> here," where the user intended to say "Route calculation to Chicago from here," the inferencing intended operations feature may model what is required to calculate a route (an origination point and a destination point). Because the utterance includes the origination point and the destination point, a request to calculate a route from the user's present location to Chicago may be inferred. Similarly, when the inferencing intended operations feature does not have sufficient information to infer a complete request, an adaptive conversational response may be generated to prompt the user for missing information. For example, when an utterance includes a request for a stock quote but not a company name (e.g., "Get me the stock price for <indecipherable>"), the response may be "What company's stock quote do you want?" The user may then provide an utterance including the company name, and the request may be completed. In one implementation, the response may ask for missing information in a way that most restricts possible interpretations (e.g., in a request for a task that requires both a city and a state, the state may be asked for first because there are fewer states than cities). Moreover, the inferencing intended operations feature may model compound tasks and/or requests by maintaining context and identifying relevant and/or missing information at both a composite and sub-task level.

The alternative expression feature may recognize common alternatives for nouns and verbs to reflect variations in usage patterns according to various criteria. For example, users may vary expression based on age, socio-economics, ethnicity, user whims, or other factors. Thus, the alternative expression feature may support variations in expression where word order is unimportant or unanticipated. Alternatives in expression based on various criteria or demographics may be loaded into context domain agents 230 and/or vocabularies 235, and the alternative expression feature may update context domain agents 230 and/or vocabularies 235 based on inferred or newly discovered variations. In one implementation, conversational speech engine 215 may include a subscription interface to update changes to context domain agents 230 and/or vocabularies 235 (e.g., a repository may aggregate various user utterances and deploy updates system wide). In operation, the alternative expression feature may allow nouns and/or verbs to be represented in different ways to give simplistic, yet representative, examples. For example, a user interested in a weather forecast for Washington, D.C. may provide any of the following utterances, each of which are interpreted equivalently: "What's the weather like in DC," "Is it raining inside the Beltway," Gimme the forecast for the capital," etc. Similarly, utterances of "Go to my home," "Go home," "Show route to home," and "I would like to know my way home" may all be interpreted equivalently, where a user profile may include the user's home address and a navigation route to the home address may be calculated.

The imperfect speech feature may be able to infer requests from contradictory or otherwise inaccurate information, such as when an utterance includes starts and stops, restarts, stutters, run-on sentences, or other imperfect speech. For example, a user may sometimes change their mind, and thus alter the request in mid-utterance, and the imperfect speech feature may nonetheless be able to infer a request based on models of human speech. For example, for an utterance of "Well, I wanna . . . Mexi . . . no, steak restaurant please, I'm hungry," existing voice user interfaces make no assumptions regarding models of human speech and would be unable to infer whether the user wanted a Mexican or steak restaurant. The imperfect speech feature overcomes these drawbacks by using various models of human understanding that may indicate that a last criterion is most likely to be correct, or intonation, emphasis, stress, use of the word "not," or other models may indicate which criterion is most likely to be correct. Thus, in the above example, the imperfect speech feature may infer that the user wants a steak restaurant.

According to one aspect of the invention, noise tolerance module 250 may be closely related to the imperfect speech feature, and may operate to discard words or noise that has no meaning in a given context so as not to create confusion. Moreover, noise tolerance module 250 may filter out environmental and non-human noise to further reduce a likelihood of confusion. In one implementation, noise tolerance module 250 may cooperate with other modules and features to filter out words that do not fit into a context. For example, one or more contexts may be identified, and words that have no meaning with respect to system capabilities, random human utterances without meaning and other noise may be filtered out. Thus, noise tolerance module 250 may model real-world conditions to identify meaningful requests. For example, noise tolerance module 250 may filter other human conversations and/or utterances within a range of one or more microphones, For example, a single device may include multiple microphones, or multiple devices may each include one or more microphones, and the noise tolerance module may collate inputs and cooperatively filter out sound by comparing a speech signal from the various microphones. Noise tolerance module 250 may also filter out non-human environmental noise within the range of the microphones, out-of-vocabulary words, which could be a result of speaker ambiguity or malapropisms, or other noise that may be unrelated to a target request. Noise models in noise tolerance module 250 may define performance benchmarks based on human criteria. For example, if a driver of a car, traveling at 65 miles-per-hour, with windows cracked is 92% likely to be understood by a passenger, then noise tolerance module 250 may have a similar performance under those conditions.

According to one aspect of the invention, conversational speech engine 215 may include a context determination process 255 that determines one or more contexts for a request to establish meaning within a conversation. The one or more contexts may be determined by having one or more context domain agents compete to determine a most appropriate domain for a given utterance, as described in U.S. patent application Ser. No. 11/197,504, entitled "Systems and Methods for Responding to Natural Language Speech Utterance," filed Aug. 5, 2005, which issued as U.S. Pat. No. 7,640,160 on Dec. 29, 2009 and U.S. patent application Ser. No. 11/212,693, entitled "Mobile Systems and Methods of Supporting Natural Language Human-Machine Interactions," filed Aug. 29, 2005, which issued as U.S. Pat. No. 7,949,529 on May 24, 2011, both of which are hereby incorporated by reference in their entirety. Once a given context domain agent "wins" the competition, the winning agent may be responsible for establishing or inferring further contexts and updating short-term and long-term shared knowledge. If there is a deadlock between context domain agents, an adaptive conversational response may prompt the user to assist in disambiguating between the deadlocked agents. For example, a user utterance of "What about traffic?" may have a distinct meaning in various contexts. That is, "traffic" may have a first meaning when the user is querying a system's media player (i.e., "traffic" would be a Rock and Roll band led by singer/songwriter Steve Winwood), a second meaning when the user is querying a search interface regarding Michael Douglas films (i.e., "traffic" would be a film directed by Steven Soderbergh), a third meaning when the user is querying a navigation device for directions to an airport (i.e., "traffic" would be related to conditions on roads along a route to the airport).

Moreover, context determination process 255 may infer intended operations and/or context based on previous utterances and/or requests, whereas existing systems consider each utterance independently, potentially making the same errors over and over again. For example, if a given interpretation turns out to be incorrect, the incorrect interpretation may be removed as a potential interpretation from one or more grammars associated with the speech recognition engine and/or from possible subsequent interpretations determined by context determination process 255, thereby assuring that a mistake will not be repeated for an identical utterance.

Context determination process 255 may overcome drawbacks of existing systems by continually updating one or more models of an existing context, where establishing context may be a by-product of a conversation, which cannot be established a priori. Context determination process 255 may establish a first context domain, change to a second context domain, change back to the first context domain, and so on, as tasks are completed, partially completed, requested, etc, and a context stack may track conversation topics and attempt to fit a current utterance into a most-recent context, next-most-recent topic, etc., traversing the context stack until a most likely intent can be established. For example, a user may utter "What's the traffic report," and context determination process 255 may establish Traffic as a context, and return an output including a traffic report, which does not happen to mention traffic on Interstate-5. The user may then utter "What about I-5?" and context determination process 255 may know that the current context is Traffic, a traffic report including information about Interstate-5 may be searched for, and the traffic report indicating that Interstate-5 is crowded may be returned as an output. The user may then utter "Is there a faster way?" and context determination process 255 may know that the current context is still Traffic, and may search for routes to a specified destination with light traffic and avoiding Interstate-5. Moreover, context determination process 255 may build context based on user profiles, environmental profiles, historical profiles, or other information to further refine the context. For example, the profiles may indicate that Interstate-5 is a typical route taken Monday through Friday.

The profiles may be particularly meaningful when attempting to disambiguate between contexts where a word has different meanings in different contexts. For example, a user may utter "What's the weather in Seattle?" and context determination process 255 may establish Weather as a context, as well as establishing Seattle as an environmental context. The user may then utter "and Portland?" and context determination process 255 may return a weather report for Portland, Oreg. based on the Weather and an environmental proximity between Portland, Oreg. and Seattle, Wash. The user may then ask "What time does the game start?" and a search for sports events with teams from Seattle and/or Portland may occur, with results presented conversationally according to methods described in greater detail below in FIG. 3. Correlatively, had user originally uttered "What's the weather in Portsmouth, N.H.," in the second utterance, context determination process 255 may instead retrieve a weather report for Portland, Me. based on an environmental proximity to New Hampshire. Moreover, when environmental profiles, contextual shared knowledge, and/or other short-term and/or long-term shared knowledge does not provide enough information to disambiguate between possibilities, responses may prompt the user with a request for further information (e.g., "Did you mean Portland, Me., or Portland, Oreg.?").

Context determination process 255 may cooperate with context domain agents 230, where each context domain agent 230 may define a collection of related functions that may be useful for users. Moreover, each context domain agent 230 may include a relevant vocabulary 235 and thought collections that model word groupings, which when evaluated together, may disambiguate one context domain from another (e.g., a Music context domain agent 230 may include a vocabulary 235 for songs, artists, albums, etc., whereas a Stock context domain agent 230 may include a vocabulary 235 for company names, ticker symbols, financial metrics, etc.). Thus, accuracy in identifying meaning may be enhanced by eliminating out-of-context words and noise words when searching for relevant combinations. In contrast, existing systems attempt to assign meaning to every component of an utterance (e.g., including out-of-context words and noise words), which results in nearly infinite possible combinations and greater likelihood of confusion. Moreover, context domain agents 230 may include metadata for each criteria to further assist in interpreting utterances, inferring intent, completing incomplete requests, etc. (e.g., a Space Needle vocabulary word may include metadata for Seattle, landmark, tourism, Sky City restaurant, etc.). Given a disambiguated criterion, context determination process 255 may thus be able to automatically determine other information needed to complete a request, discard importance of word order, and perform other enhancements for conversational speech.

Context domain agents 230 may also be self-aware, assigning degrees of certainty to one or more generated hypotheses, where a hypothesis may be developed to account for variations in environmental conditions, speaker ambiguity, accents, or other factors. Conceptually, context domain agents 230 may be designed to model utterances as a hard-of-hearing person would at a noisy party. By identifying a context, capabilities within the context, vocabularies within the context, what tasks are done most often historically in the context, what task was just completed, etc., a context domain agent 230 may establish intent from rather meager phonetic clues. Moreover, the context stack may be one of a plurality of components for establishing context, and thus not a constraint upon the user. All context domains may be accessible, allowing the user to switch contexts at any time without confusion. Thus, just as in human-to-human conversation, context domains may be rapidly selected, without menu-driven dead ends, when an utterance is unambiguous. For example, a user may utter, "Please call Rich Kennewick on his cell phone," and a system response of "Do you wish me to call Rich Kennewick on his cell?" may be generated. The user may decide at that point to call Rich Kennewick later, and instead, listen to some music. Thus, the user may then utter, "No, play the Louis Armstrong version of Body and Soul from my iPod," and a system response of "Playing Body and Soul by Louis Armstrong" may be generated as Body and Soul is played through a media player. In this example, the later utterance has no contextual connection to the first utterance, yet because request criteria in the utterances are unambiguous, contexts can be switched easily without relying on the context stack.

Figure 3:
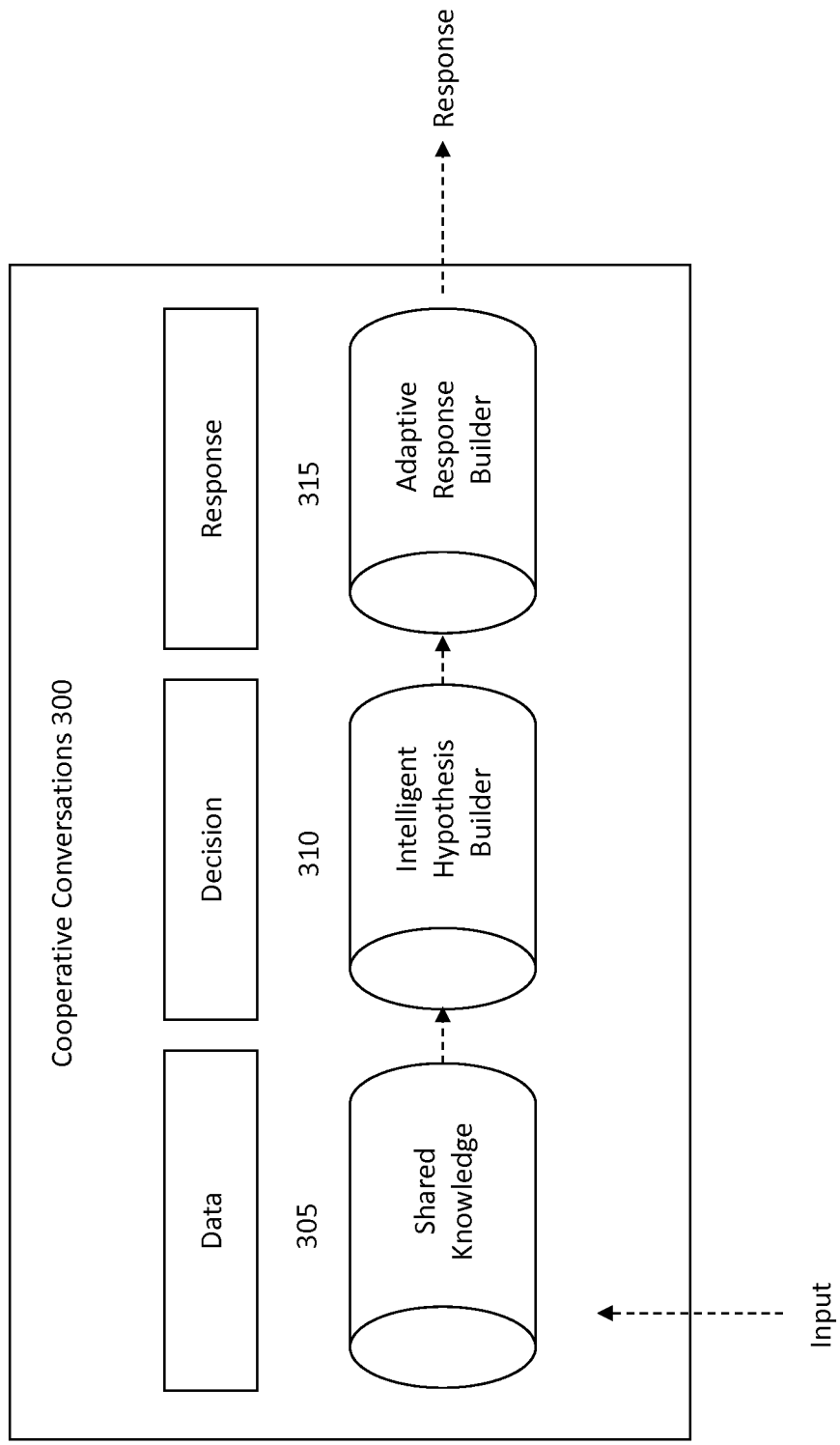
FIG. 3 is an exemplary block diagram of a cooperative conversational model according to one aspect of the invention.

Referring to FIG. 3, an exemplary cooperative conversational model 300 is illustrated according to an aspect of the invention. Cooperative conversational model 300 may build upon free form voice search 245, noise tolerance 250, and context determination 255 to implement a conversational Human-to-Machine interface that reflects how humans interact with each other and their normal behavior in conversation. Simply put, cooperative conversational model 300 enables humans and machines to participate in a conversation with an accepted purpose or direction, with each participant contributing to the conversation for the benefit of the conversation. That is, cooperative conversational model 300 incorporates technology and process-flow that takes advantage of human presumptions about utterances that humans rely upon, both as speakers and listeners, thereby creating a Human-to-Machine interface that is analogous to everyday human-to-human conversation. In one implementation, a cooperative conversation may take incoming data (shared knowledge) 305 to inform a decision (intelligent hypothesis building) 310, and then may refine the decision and generate a response (adaptive response building) 315.

According to one aspect of the invention, shared knowledge 305 includes both short-term and long-term knowledge about incoming data. Short-term knowledge may accumulate during a single conversation, while long-term knowledge may accumulate over time to build user profiles, environmental profiles, historical profiles, cognitive profiles, etc.

Input received during a single conversation may be retained in a Session Input Accumulator. The Session Input Accumulator may include cross-modality awareness, where in addition to accumulating input relating to user utterances, requests, locations, etc., the Session Input Accumulator may accumulate a current user interface state relating to other modal inputs to further build shared knowledge models and more accurate adaptive responses (e.g., when a user utters a request relating to a portion of a touch-screen device, as described above). For example, the Session Input Accumulator may accumulate inputs including recognition text for each utterance, a recorded speech file for each utterance, a list-item selection history, a graphical user interface manipulation history, or other input data. Thus, the Session Input Accumulator may populate Intelligent Hypothesis Builder 310 with current and relevant information, build long-term shared knowledge by identifying information with long-term significance, provide Adaptive Response Builder 315 with relevant state and word usage information, retain recent contexts for use with Intelligent Hypothesis Builder 310, and/or retain utterances for reprocessing during multi-pass evaluations. Moreover, because cooperative conversations 300 model human conversations, short-term session data may be expired after a psychologically appropriate amount of time, thereby humanizing system behavior. For example, a human is unlikely to recall a context of a conversation from two years ago, but because the context would be identifiable by a machine, session context is expired after a predetermined amount of time to reduce a likelihood of contextual confusion based on stale data. However, relevant information from an expired session context may nonetheless be added to user, historical, environmental, cognitive, or other long-term knowledge models.

Long-term shared knowledge may generally be user-centric, rather than session-based. That is, inputs may be accumulated over time to build user, environmental, cognitive, historical, or other long-term knowledge models. Long-term and short-term shared knowledge (collectively, shared knowledge 305) may be used simultaneously anytime a user engages in a cooperative conversation 300. Long-term shared knowledge may include explicit and/or implicit user preferences, a history of most recently used agents, contexts, requests, tasks, etc., user-specific jargon related to vocabularies and/or capabilities of an agent and/or context, most often used word choices, or other information. The long-term shared knowledge may be used to populate Intelligent Hypothesis Builder 310 with current and relevant information, provide Adaptive Response Builder 315 with appropriate word choices when the appropriate word choices are unavailable via the Session Input Accumulator, refine long-term shared knowledge models, identify a frequency of specific tasks, identify tasks a user frequently has difficulty with, or provide other information and/or analysis to generate more accurate conversational responses.

As described above, shared knowledge 305 may be used to populate Intelligent Hypothesis Builder 310, such that a user and a voice user interface may share assumptions and expectations such as topic knowledge, conversation history, word usage, jargon, tone (e.g., formal, humorous, terse, etc.), or other assumptions and/or expectations that facilitate interaction at a Human-to-Machine interface.

According to an aspect of the invention, one component of a successful cooperative conversation may be identifying a type of conversation from an utterance. By categorizing and developing conceptual models for various types of exchanges, user expectations and domain capabilities may be consistently aligned. Intelligent Hypothesis Builder 310 may generate a hypothesis as to a conversation type by considering conversational goals, participant roles, and/or an allocation of information among the participants. Conversational goals may broadly include: (1) getting a discrete piece of information or performing a discrete task, (2) gathering related pieces of information to make a decision, and/or (3) disseminating or gathering large amounts of information to build expertise. Participant roles may broadly include: (1) a leader that controls a conversation, (2) a supporter that follows the leader and provides input as requested, and/or (3) a consumer that uses information. Information may be held by one or more of the participants at the outset of a conversation, where a participant may hold most (or all) of the information, little (or none) of the information, or the information may be allocated roughly equally amongst the participants. Based on the conversational goals, participant roles, and allocation of information, Intelligent Hypothesis Builder 310 may consider various factors to classify a conversation (or utterance) into general types of conversations that can interact with one another to form many more variations and permutations of conversation types (e.g., a conversation type may change dynamically as information is reallocated from one participant to another, or as conversational goals change based on the reallocation of information).

For example, in one implementation, a query conversation may include a conversational goal of getting a discrete piece of information or performing a particular task, where a leader of the query conversation may have a specific goal in mind and may lead the conversation toward achieving the goal. The other participant may hold the information and may support the leader by providing the information. In a didactic conversation, a leader of the conversation may control information desired by a supporter of the conversation. The supporter's role may be limited to regulating an overall progression of the conversation and interjecting queries for clarification. In an exploratory conversation, both participants share leader and supporter roles, and the conversation may have no specific goal, or the goal may be improvised as the conversation progresses. Based on this model, Intelligent Hypothesis Builder 310 may broadly categorize a conversation (or utterance) according to the following diagram:

|  | Participant A<br>User | Participant B<br>Voice User Interface |
|---|---|---|
| QUERY | | |
| GOAL | Get information/action | Provide information/action |
| ROLE | Leader/Consumer | Supporter/Dispenser |
| INFORMATION ALLOCATION | Less | More |
| DIDACTIC | | |
| GOAL | Get information | Provide information |
| ROLE | Follower/Consumer | Leader/Dispenser |
| INFORMATION ALLOCATION | Less | More |
| EXPLORATORY | | |
| GOAL | Gather/share information | Gather/share information |
| ROLE | Follower/Consumer and Leader/Dispenser | Follower/Consumer and Leader/Dispenser |
| INFORMATION ALLOCATION | Equal or alternating | Equal or alternating |

Intelligent Hypothesis Builder 310 may use an identified conversation type to assist in generating a set of hypotheses as to a user's intent in an utterance. In addition, Intelligent Hypothesis Builder 310 may use short-term shared knowledge from the Session Input Accumulator to proactively build and evaluate interaction with a user as a conversation progresses, as well as long-term shared knowledge to proactively build and evaluate interaction with the user over time. Intelligent Hypothesis Builder 310 may thus adaptively arrive at a set of N-best hypotheses about user intent, and the N-best hypotheses may be provided to an Adaptive Response Builder 315. In addition, Intelligent Hypothesis Builder 310 may model human-to-human interaction by calculating a degree of certainty for each of the hypotheses. That is, just as humans rely on knowledge shared by participants to examine how much and what kind of information was available, Intelligent Hypothesis Builder 310 may leverage the identified conversation type and short-term and long-term shared knowledge to generate a degree of certainty for each hypothesis.

According to another aspect of the invention, Intelligent Hypothesis Builder 310 may generate one or more explicit hypotheses of a user's intent when an utterance contains all information (including qualifiers) needed to complete a request or task. Each hypothesis may have a corresponding degree of certainty, which may be used to determine a level of unprompted support to provide in a response. For example, a response may include a confirmation to ensure the utterance was not misunderstood or the response may adaptively prompt a user to provide missing information.

According to another aspect of the invention, Intelligent Hypothesis Builder 310 may use short-term knowledge to generate one or more implicit hypotheses of a user's intent when an utterance may be missing required qualifiers or other information needed to complete a request or task. Each hypothesis may have a corresponding degree of certainty. For instance, when a conversation begins, short-term knowledge stored in the Session Input Accumulator may be empty, and as the conversation progresses, the Session Input Accumulator may build a history of the conversation. Intelligent Hypothesis Builder 310 may use data in the Session Input Accumulator to supplement or infer additional information about a current utterance. For example, Intelligent Hypothesis Builder 310 may evaluate a degree of certainty based on a number of previous requests relevant to the current utterance. In another example, when the current utterance contains insufficient information to complete a request or task, data in the Session Input Accumulator may be used to infer missing information so that a hypothesis can be generated. In still another example, Intelligent Hypothesis Builder 310 may identify syntax and/or grammar to be used by Adaptive Response Builder 315 to formulate personalized and conversational response. In yet another example, when the current utterance contains a threshold amount of information needed to complete a request or task, data in the Session Input Accumulator may be relied upon to tune a degree of certainty.

According to another aspect of the invention, Intelligent Hypothesis Builder 310 may use long-term shared knowledge to generate one or more implicit hypotheses of a user's intent when an utterance is missing qualifiers or other information needed to complete a request or task. Each hypothesis may have a corresponding degree of certainty. Using long-term knowledge may be substantially similar to using short-term shared knowledge, except that information may be unconstrained by a current session, and an input mechanism may include information from additional sources other than conversational sessions. For example, Intelligent Hypothesis Builder 310 may use information from long-term shared knowledge at any time, even when a new conversation is initiated, whereas short-term shared knowledge may be limited to an existing conversation (where no short-term shared knowledge would be available when a new conversation is initiated). Long-term shared knowledge may come from several sources, including user preferences or a plug-in data source (e.g., a subscription interface to a remote database), expertise of a user (e.g., based on a frequency of errors, types of tasks requested, etc., the user may be identified as a novice, intermediate, experienced, or other type of user), agent-specific information and/or language that may also apply to other agents (e.g., by decoupling information from an agent to incorporate the information into other agents), frequently used topics passed in from the Session Input Accumulator, frequently used verbs, nouns, or other parts of speech, and/or other syntax information passed in from the Session Input Accumulator, or other sources of long-term shared knowledge may be used.

According to another aspect of the invention, knowledge-enabled utterances, as generated by Intelligent Hypothesis Builder 310, may include one or more explicit (supplied by a user), and one or more implicit (supplied by Intelligent Hypothesis Builder 310) contextual signifiers, qualifiers, criteria, and other information that can be used to identify and evaluate relevant tasks. At that point, Intelligent Hypothesis Builder 310 may provide an input to Adaptive Response Builder 315. The input received by Adaptive Response Builder 315 may include at least a ranked list of hypotheses, including explicit and/or implicit hypotheses, each of which may have a corresponding degree of certainty. A hypothesis may be assigned one of four degrees of certainty: (1) "sure," where contextual signifiers and qualifiers relate to one task, context and qualifiers relate to one task, and a confidence level associated with a preliminary interpretation generated at the speech recognition engine exceeds a predetermined threshold; (2) "pretty sure," where contextual signifiers and qualifiers relate to more than one task (select top-ranked task) and criteria relates to one request, and/or the confidence level associated with the preliminary interpretation generated at the speech recognition engine is below the predetermined threshold; (3) "not sure," where additional contextual signifiers or qualifiers are needed to indicate or rank a task; and (4) "no hypothesis," where little or no information can be deciphered. Each degree of certainty may further be classified as explicit or implicit, which may be used to adjust a response. The input received by Adaptive Response Builder 310 may also include a context, user syntax and/or grammar, context domain agent specific information and/or preferences (e.g., a travel context domain agent may know a user frequently requests information about France, which may be shared with a movie context domain agent so that responses may occasionally include French movies).

According to another aspect of the invention, Adaptive Response Builder 315 may build syntactically, grammatically, and contextually sensitive "intelligent responses" that can be used with one or more agents to generate a conversational experience for a user, while also guiding the user to reply in a manner favorable for recognition. In one implementation, the intelligent responses may include a verbal or audible reply played through an output device (e.g., a speaker), and/or an action performed by a device, computer, or machine (e.g., downloading a web page, showing a list, executing an application, etc.). In one implementation, an appropriate response may not require conversational adaptation, and default replies and/or randomly selected response sets for a given task may be used.

According to another aspect of the invention, Adaptive Response Builder 310 may draw on information maintained by Intelligence Hypothesis Builder 310 to generate responses that may be sensitive to context, task recognition of a current utterance, what a user already knows about a topic, what an application already knows about the topic, shared knowledge regarding user preferences and/or related topics, appropriate contextual word usage (e.g., jargon), words uttered by the user in recent utterances, conversational development and/or course correction, conversational tone, type of conversation, natural variation in wording of responses, or other information. As a result, Adaptive Response Builder 315 may generate intelligent responses that create conversational feel, adapt to information that accumulates over a duration of a conversation, maintain cross-modal awareness, and keep the conversation on course.

According to another aspect of the invention, Adaptive Response Builder 315 may create a conversational feel by adapting to a user's manner of speaking, framing responses appropriately, and having natural variation and/or personality (e.g., by varying tone, pace, timing, inflection, word use, jargon, and other variables in a verbal or audible response). Adapting to a user's manner of speaking may include using contextual signifiers and grammatical rules to generate one or more sentences for use as response sets that may cooperate with the user. By taking advantage of short-term (from the Session Input Accumulator) and long-term (from one or more profiles) shared knowledge about how a user utters a request, the responses may be modeled using techniques used to recognize requests. Adaptive Response Builder 315 may rate possible responses statistically and/or randomize responses, which creates an opportunity to build an exchange with natural variation and conversational feel. This may be a significant advantage over existing voice user interfaces with incongruous input and output, where the input is "conversational" and the output is "computerese." The following examples may demonstrate how a response may adapt to a user's input word choices and manner of speaking:

| | |
|---|---|
| User | Do you know [mumbled words] Seattle [more mumbled words]? |
| Voice User Interface | Did you want Seattle sports scores, weather, traffic, or news? |
| User | Find me [mumbled words] Seatle [more mumbled words]? |
| Voice User Interface | I found Seattle, did you want sports scores, weather, traffic, or news? |

| | |
|---|---|
| User | Get me [mumbled words] Seattle [more mumbled words]? |
| Voice User Interface | I've got Seattle, did you want me to get sports scores, weather, traffic, or news? |

According to another aspect of the invention, Adaptive Response Builder 315 may frame responses to influence a user to reply with an utterance that may be easily recognized. For example, a user may utter, "Get me the news" and a voice user interface response may be "Which of these categories? Top news stories, international news, political news, or sports news?" The response may be likely to illicit utterances from the user, such as "Top news stories" or "International news," which are more likely to result in a completed request. Thus, the responses may conform to a cooperative nature of human dialog, and a natural human tendency to "parrot" what was just heard as part of a next utterance. Moreover, knowledge of current context may enhance responses to generate more meaningful conversational responses, such as in the following exchange:

| | |
|---|---|
| User | What's the weather like in Dallas? |
| Voice User Interface | In Dallas, it's sunny and 90 degrees. |
| User | What theaters are showing the movie "The Fantastic Four" there? |
| Voice User Interface | 10 theaters in Dallas are showing "The Fantastic Four." Do you want show times for a particular theater? |

Framing the responses may also deal with misrecognitions according to human models. For example, humans frequently remember a number of recent utterances, especially when one or more previous utterances were misrecognized or unrecognized. Another participant in the conversation may limit correction to a part of the utterance that was misrecognized or unrecognized, or over subsequent utterances and/or other interactions, clues may be provided to indicate the initial interpretation was incorrect. Thus, by storing and analyzing multiple utterances, utterances from earlier in a conversation may be corrected as the conversation progresses.

According to another aspect of the invention, Adaptive Response Builder 315 may generate multi-modal, or cross-modal, responses to a user. In one implementation, responses may be aware of and control one or more devices and/or interfaces, and users may respond by using whichever input method, or combination of input methods, is most convenient. For example, a response asking the user to direct an utterance with a "Yes" or "No" in a multi-modal environment may also display alternatives visually.

According to another aspect of the invention, Adaptive Response Builder 315 may correct a course of a conversation without interrupting conversational flow. Adaptive Response Builder 315 may generate intelligent responses based on the ranked list of hypotheses and corresponding degrees of certainty, which may be used to correct a course of a conversation without interrupting conversational flow. That is, even though the intelligent responses may be reasonably "sure," the intelligent responses may nonetheless sometimes be incorrect. While existing voice user interfaces tend to fail on average conversational missteps, normal human interactions may expect missteps and deal with them appropriately. Thus, responses after a misrecognition may be modeled after clarifications, rather than errors, and words may chosen in subsequent responses that move conversation forward and establish an appropriate domain to be explored with the user. For example, course correction may result in the following exchange:

| | |
|---|---|
| User | Can you get [mumbled words here] Mariners [more mumbled words]? |
| Voice User Interface | I've got the score for the Mariners game? 4-2 Mariners. |
| User | No, the start time for tomorrow's game. |
| Voice User Interface | Oh, 7:05. |

The above disclosure has been described in terms of specific exemplary aspects, implementations, and embodiments of the invention. However, those skilled in the art will recognize various changes and modifications that may be made without departing from the scope and spirit of the invention. Therefore, the specification and drawings are to be regarded as exemplary only, and the scope of the invention is to be determined solely by the appended claims.

What is claimed is:

1. A computer-implemented method of facilitating natural language system responses using short-term knowledge generated based on one or more prior multi-modal device interactions, the method being implemented by a computer system that includes one or more physical processors executing one or more computer program instructions which, when executed, perform the method, the method comprising:

receiving, by the computer system during a first conversation, a first voice input via a first input device, the first voice input comprising a first natural language utterance;

receiving, by the computer system, a second voice input comprising the first natural language utterance via a second input device;

comparing, by the computer system, the first voice input with the second voice input;

filtering, by the computer system, sound from the first voice input and the second voice input based on the comparison;

obtaining, by the computer system during the first conversation, a user interface state related to one or more non-voice inputs associated with the first voice input, the one or more non-voice inputs comprising at least a first non-voice input;

generating, by the computer system, the short-term knowledge based on at least the first voice input and the first non-voice input;

determining, by the computer system, based on the short-term knowledge, a first context for the first natural language utterance;

determining, by the computer system, based on the first context, an interpretation of the first natural language utterance; and generating, by the computer system, based on the interpretation of the first natural language utterance, a first response to the first natural language utterance.

2. The method of claim 1, the method further comprising:
receiving, at the computer system, a second natural language utterance via the first input device;

determining, by the computer system, based on the short-term knowledge, whether the second natural language utterance corresponds to the first context;
determining, by the computer system, responsive to the second natural language utterance not corresponding to the first context, a second context for the second natural language utterance based on the short-term knowledge;
determining, by the computer system, based on the second context, an interpretation of the second natural language utterance; and
generating, by the computer system, based on the interpretation of the second natural language utterance, a response to the second natural language utterance.

3. The method of claim 1, the method further comprising:
tracking, by the computer system, contexts identified for multiple consecutive natural language user utterances to generate a context stack, the context stack including the contexts identified for the multiple consecutive natural language user utterances;
receiving, at the computer system, a second natural language utterance via the first input device; and
determining, by the computer system, based on the short-term knowledge, whether the second natural language utterance corresponds to one or more individual ones of the contexts included in the context stack.

4. The method of claim 3, wherein determining whether the second natural language utterance corresponds to one or more individual ones of the contexts included in the context stack includes:
determining whether the second natural language utterance corresponds to a most recent context included in the context stack; and
responsive to the second natural language utterance not corresponding to the most recent context, determining whether the second natural language utterance corresponds to a second most recent context included in the context stack.

5. The method of claim 3, further comprising:
determining, by the computer system, responsive to the second natural language utterance not corresponding to one or more individual ones of the contexts included in the context stack, a second context for the second natural language utterance based on the short-term knowledge; and
determining, by the computer system, based on the second context, an interpretation of the second natural language utterance.

6. The method of claim 1, wherein determining the interpretation of the first natural language utterance comprises determining, based on the first context, an interpretation of one or more recognized words of the first natural language utterance.

7. The method of claim 1, the method further comprising:
expiring, by the computer system, one or more items of short-term knowledge that are based on one or more natural language utterances received during conversations occurring prior to the first conversation.

8. The method of claim 7, further comprising:
accumulating, by the computer system, long-term knowledge based on the one or more items of short-term knowledge that are expired.

9. The method of claim 1, the method further comprising:
accumulating, by the computer system, long-term knowledge, wherein the long-term knowledge is accumulated based on one or more natural language utterances received during conversations occurring prior to the first conversation, wherein the first context is determined based on the short-term knowledge and the long-term knowledge.

10. The method of claim 1, further comprising:
determining, by the computer system, based on the short-term knowledge, a manner in which the first natural language utterance is spoken, wherein the first response is generated based on the determined manner and the interpretation of the first natural language utterance.

11. The method of claim 10, wherein the manner in which the first natural language utterance is spoken includes at least one of a tone, a pace, an inflection, or a timing.

12. The method of claim 1, wherein the second input device is included with the first input device in a single device.

13. The method of claim 1, wherein generating the first response comprises generating, by the computer system, a non-voice response in a graphical user interface and/or a voice response via a speaker.

14. The method of claim 1, wherein the first natural language utterance relates to a request and the first response is intended to be responsive to the request, the method further comprising:
receiving, by the computer system, a second natural language utterance in response to the first response, wherein the second natural language utterance comprises a clarification related to the interpretation of the first natural language utterance; and
responsive to receipt of the second natural language utterance, generating, by the computer system, a response to the second natural language utterance based on the interpretation of the first natural language utterance and the clarification related to the interpretation of the first natural language utterance.

15. The method of claim 1, wherein the first non-voice input is received via a non-voice input device comprising a touch screen device, the method further comprising:
receiving, by the computer system, information indicating a location on the touch screen device that received the first non-voice input.

16. A system for facilitating natural language system responses via short-term knowledge generated based on one or more prior multi-modal device interactions, the system comprising:
one or more physical processors programmed with one or more computer program instructions which, when executed, cause the one or more physical processors to:
receive, during a first conversation, a first voice input via a first input device, the first voice input comprising a first natural language utterance;
receive a second voice input comprising the first natural language utterance via a second input device;
compare the first voice input with the second voice input;
filter sound from the first voice input and the second voice input based on the comparison;
obtain, during the first conversation, a user interface state related to one or more non-voice inputs associated with the first voice input, the one or more non-voice inputs comprising at least a first non-voice input;
generate the short-term knowledge based on at least the first voice input and the first non-voice input;
determine, based on the short-term knowledge, a first context for the first natural language utterance;
determine, based on the first context, an interpretation of the first natural language utterance; and generate, based on the interpretation of the first natural language utterance, a first response to the first natural language utterance.

17. The system of claim 16, wherein the one or more physical processors are further caused to:
receive a second natural language utterance via the first input device;
determine, based on the short-term knowledge, whether the second natural language utterance corresponds to the first context;
determine, responsive to the second natural language utterance not corresponding to the first context, a second context for the second natural language utterance based on the short-term knowledge;
determine, based on the second context, an interpretation of the second natural language utterance; and
generate, based on the interpretation of the second natural language utterance, a response to the second natural language utterance.

18. The system of claim 16, wherein the one or more physical processors are further caused to:
track contexts identified for multiple consecutive natural language user utterances to generate a context stack, the context stack including the contexts identified for the multiple consecutive natural language user utterances;
receive a second natural language utterance via the first input device; and
determine, based on the short-term knowledge, whether the second natural language utterance corresponds to one or more individual ones of the contexts included in the context stack.

19. The system of claim 18, wherein determining whether the second natural language utterance corresponds to one or more individual ones of the contexts included in the context stack includes:
determining whether the second natural language utterance corresponds to a most recent context included in the context stack; and
responsive to the second natural language utterance not corresponding to the most recent context, determining whether the second natural language utterance corresponds to a second most recent context included in the context stack.

20. The system of claim 18, wherein the one or more physical processors are caused to:
determine, responsive to the second natural language utterance not corresponding to one or more individual ones of the contexts included in the context stack, a second context for the second natural language utterance based on the short-term knowledge; and
determine, based on the second context, an interpretation of the second natural language utterance.

21. The system of claim 16, wherein determining the interpretation of the first natural language utterance comprises determining, based on the first context, an interpretation of one or more recognized words of the first natural language utterance.

22. The system of claim 16, wherein the one or more physical processors are caused to:
expire one or more items of accumulated short-term knowledge that are based on one or more natural language utterances received during conversations occurring prior to the first conversation; and
accumulate long-term knowledge based on the one or more items of accumulated short-term knowledge that are expired, wherein the first context is determined based on short-term knowledge and the long-term knowledge.

23. The system of claim 16, wherein the one or more physical processors are caused to:
determine, based on the short-term knowledge, a manner in which the first natural language utterance is spoken, wherein the first response is generated based on the determined manner and the interpretation of the first natural language utterance.

24. The system of claim 23, wherein the manner in which the first natural language utterance is spoken includes at least one of a tone, a pace, an inflection, or a timing.

25. The system of claim 16, wherein the second input device is included with the first input device in a single device.

26. The system of claim 16, wherein to generate the first response, the one or more physical processors are caused to:
generate a non-voice response in a graphical user interface and/or a voice response via a speaker.

27. The system of claim 16, wherein the first natural language utterance relates to a request and the first response is intended to be responsive to the request, wherein the one or more physical processors are further caused to:
receive a second natural language utterance in response to the first response, wherein the second natural language utterance comprises a clarification related to the interpretation of the first natural language utterance; and
responsive to receipt of the second natural language utterance, generate a response to the second natural language utterance based on the interpretation of the first natural language utterance and the clarification related to the interpretation of the first natural language utterance.

28. The system of claim 16, wherein the first non-voice input is received via a non-voice input device comprising a touch screen device, and wherein the one or more physical processors are further caused to:
receive information indicating a location on the touch screen device that received the first non-voice input.

* * * * *